(12) United States Patent
Park et al.

(10) Patent No.: US 7,507,948 B2
(45) Date of Patent: Mar. 24, 2009

(54) METHOD OF DETECTING OBJECT USING STRUCTURED LIGHT AND ROBOT USING THE SAME

(75) Inventors: Dong-ryeol Park, Hwaseong-si (KR); Hyoung-ki Lee, Suwon-si (KR); Dong-jo Kim, Yongin-si (KR); Seok-won Bang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 142 days.

(21) Appl. No.: 11/590,744

(22) Filed: Nov. 1, 2006

(65) Prior Publication Data

US 2007/0267570 A1 Nov. 22, 2007

(30) Foreign Application Priority Data

May 17, 2006 (KR) .................. 10-2006-0044419

(51) Int. Cl.
*G06M 7/00* (2006.01)
*H01J 40/14* (2006.01)
(52) U.S. Cl. .............. 250/221; 250/559.19; 250/559.33
(58) Field of Classification Search .................. 250/221, 250/559.19, 559.33
See application file for complete search history.

(56) References Cited

U.S. PATENT DOCUMENTS

| 4,979,815 | A | * | 12/1990 | Tsikos | 356/3.06 |
| 6,594,844 | B2 | * | 7/2003 | Jones | 250/559.33 |
| 2005/0171644 | A1 | * | 8/2005 | Tani | 700/253 |
| 2007/0145235 | A1 | * | 6/2007 | Chen | 250/206.2 |

FOREIGN PATENT DOCUMENTS

| JP | 5-341842 | 12/1993 |
| JP | 6-43935 | 2/1994 |
| JP | 11-63986 | 3/1999 |
| JP | 2004-174149 | 6/2004 |
| KR | 2002-0038296 | 5/2002 |
| KR | 2004-0002162 | 1/2004 |

* cited by examiner

*Primary Examiner*—Seung C Sohn
(74) *Attorney, Agent, or Firm*—Staas & Halsey LLP

(57) ABSTRACT

A method of detecting an object using a structured light and a robot using the same are disclosed. The method of detecting a floor object using a structured light includes measuring a height difference of a position onto which a specified structured light is projected with a reference position, and detecting the floor object using the measured height difference.

26 Claims, 20 Drawing Sheets

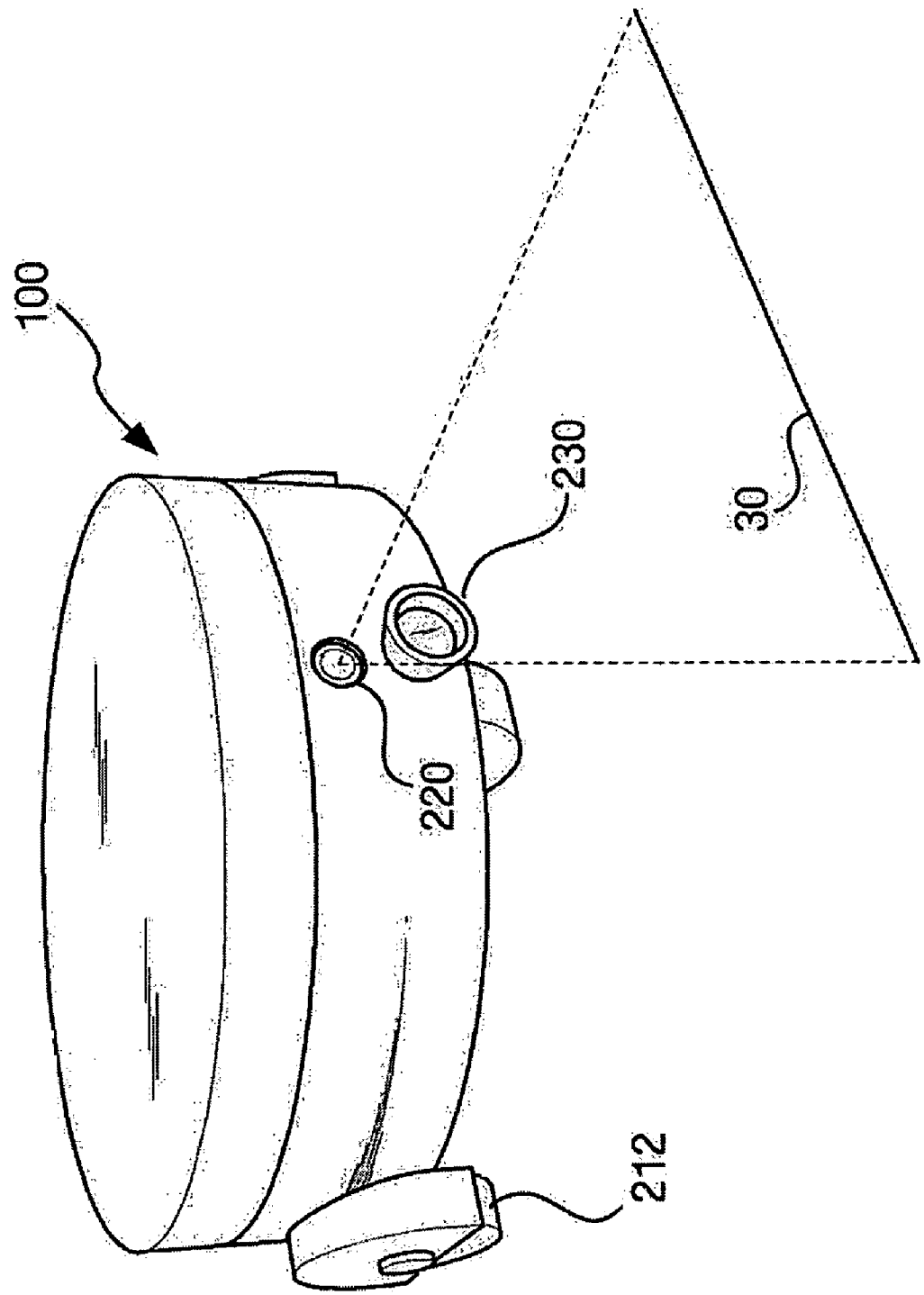

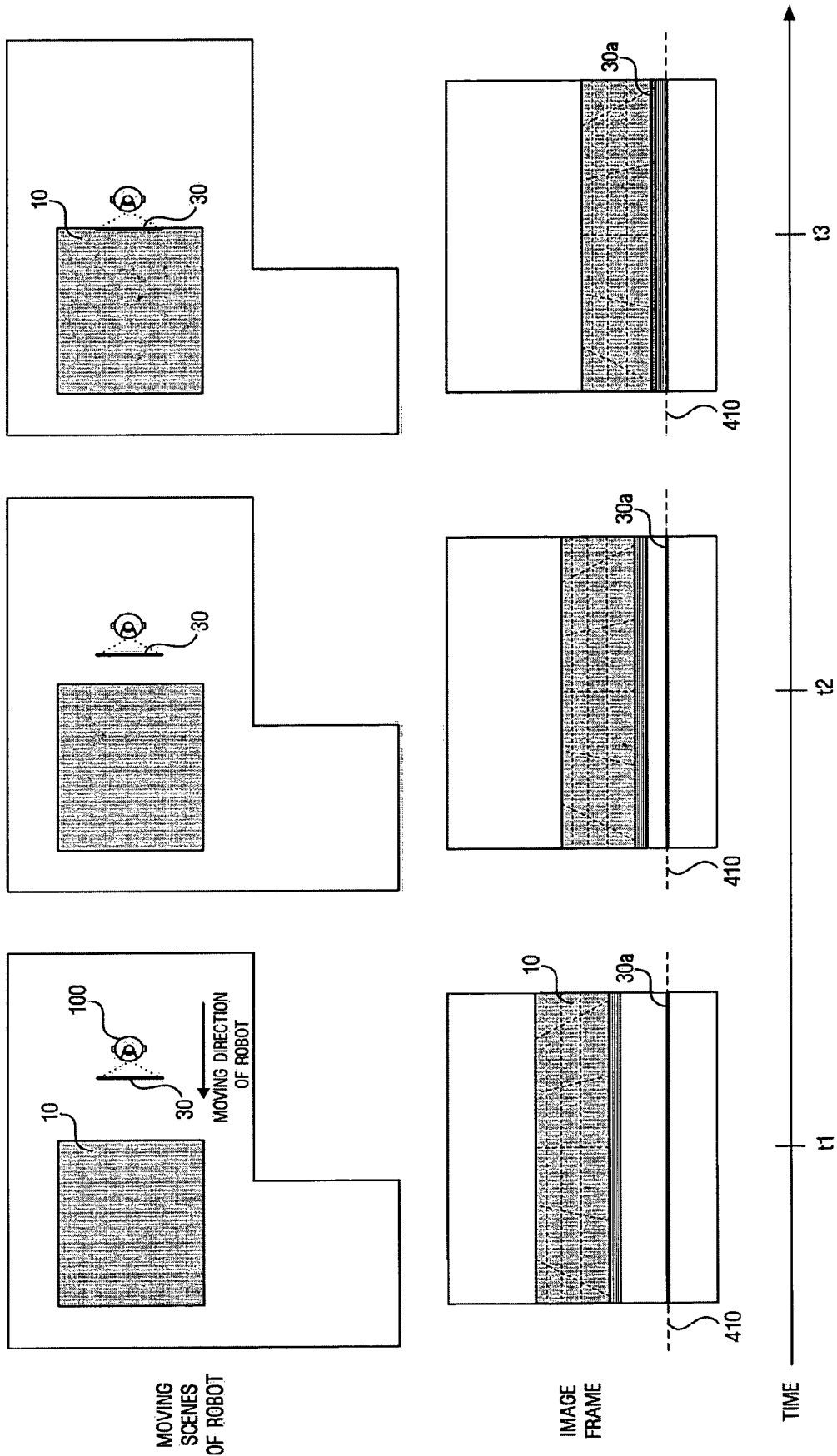

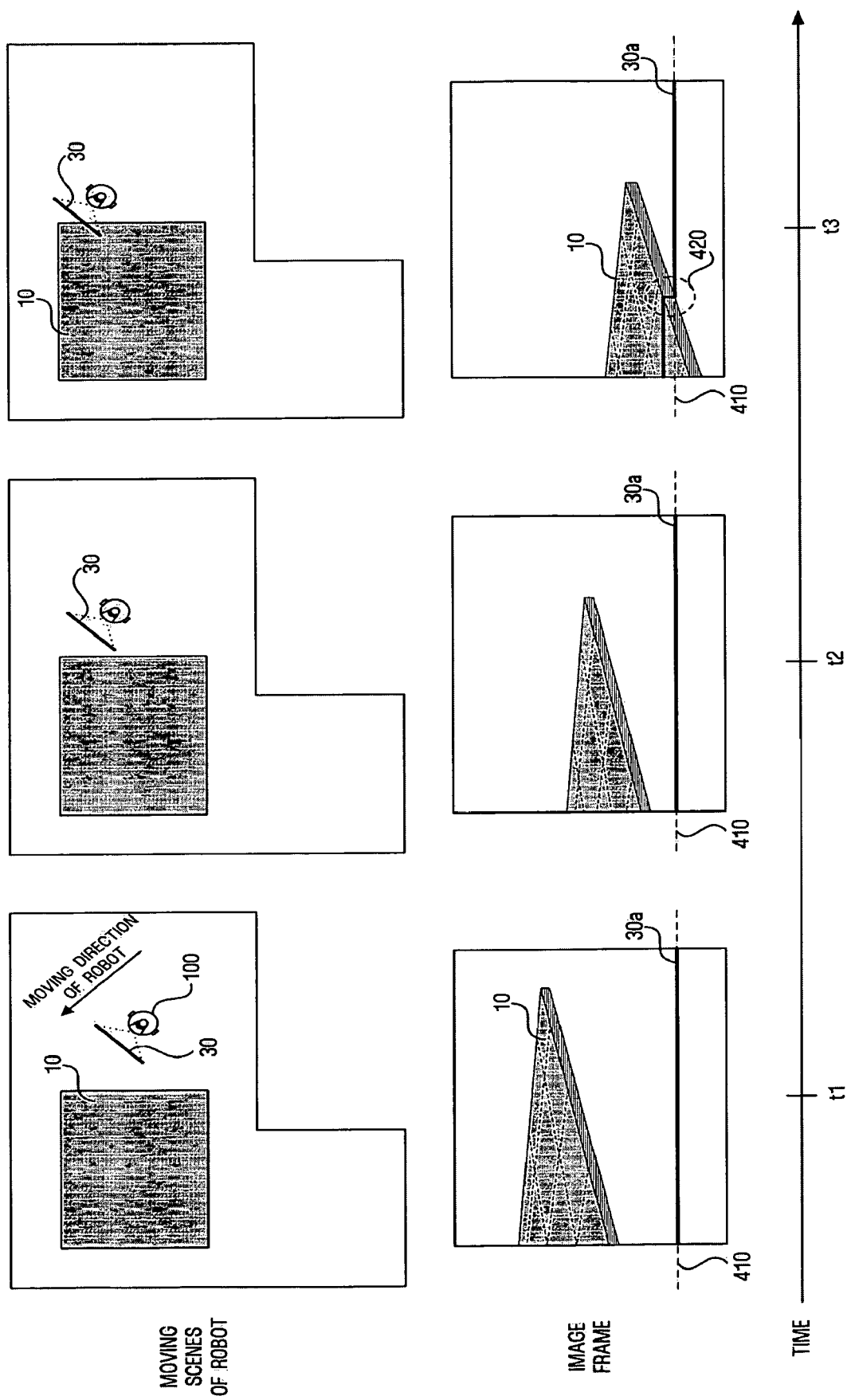

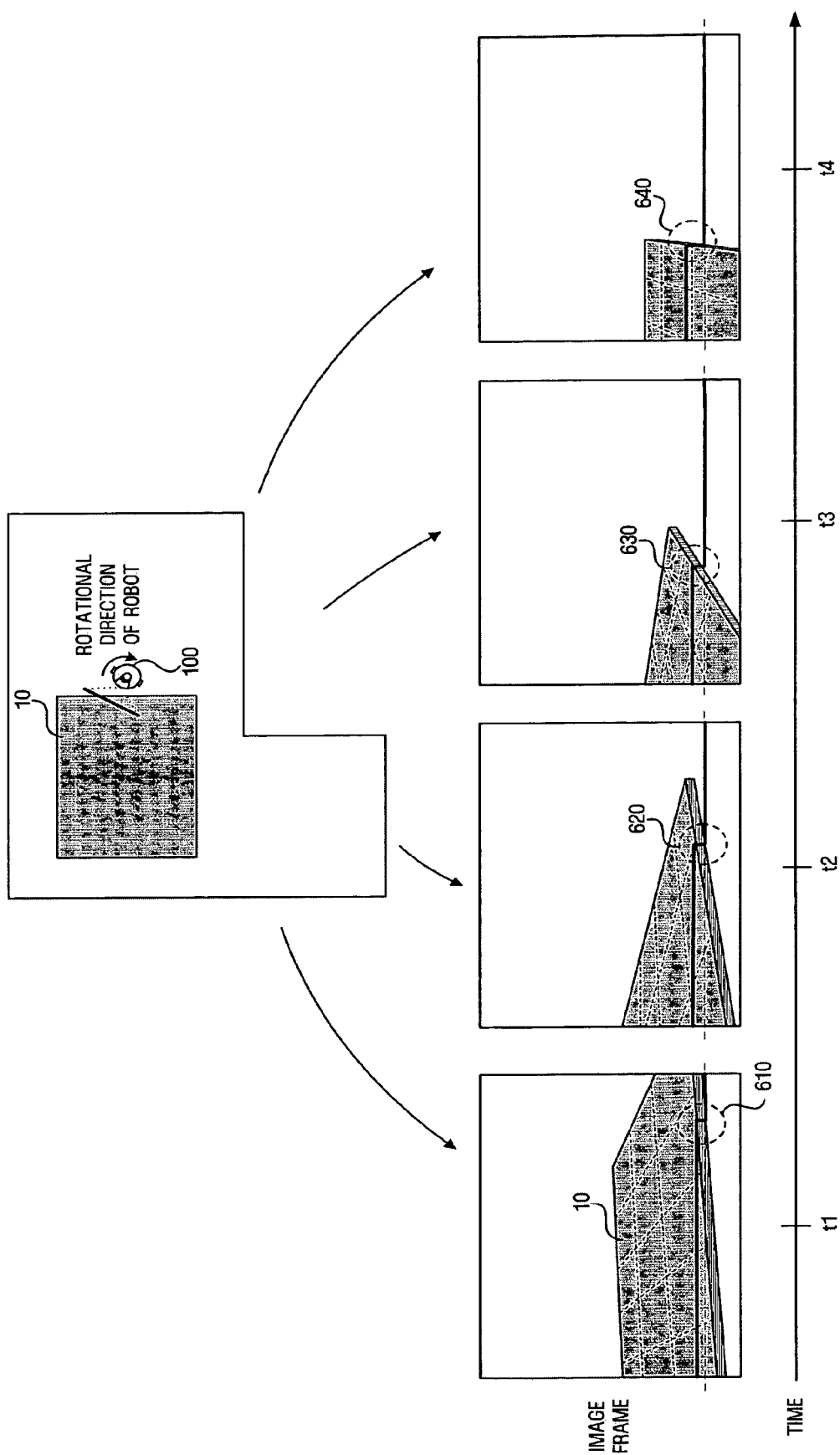

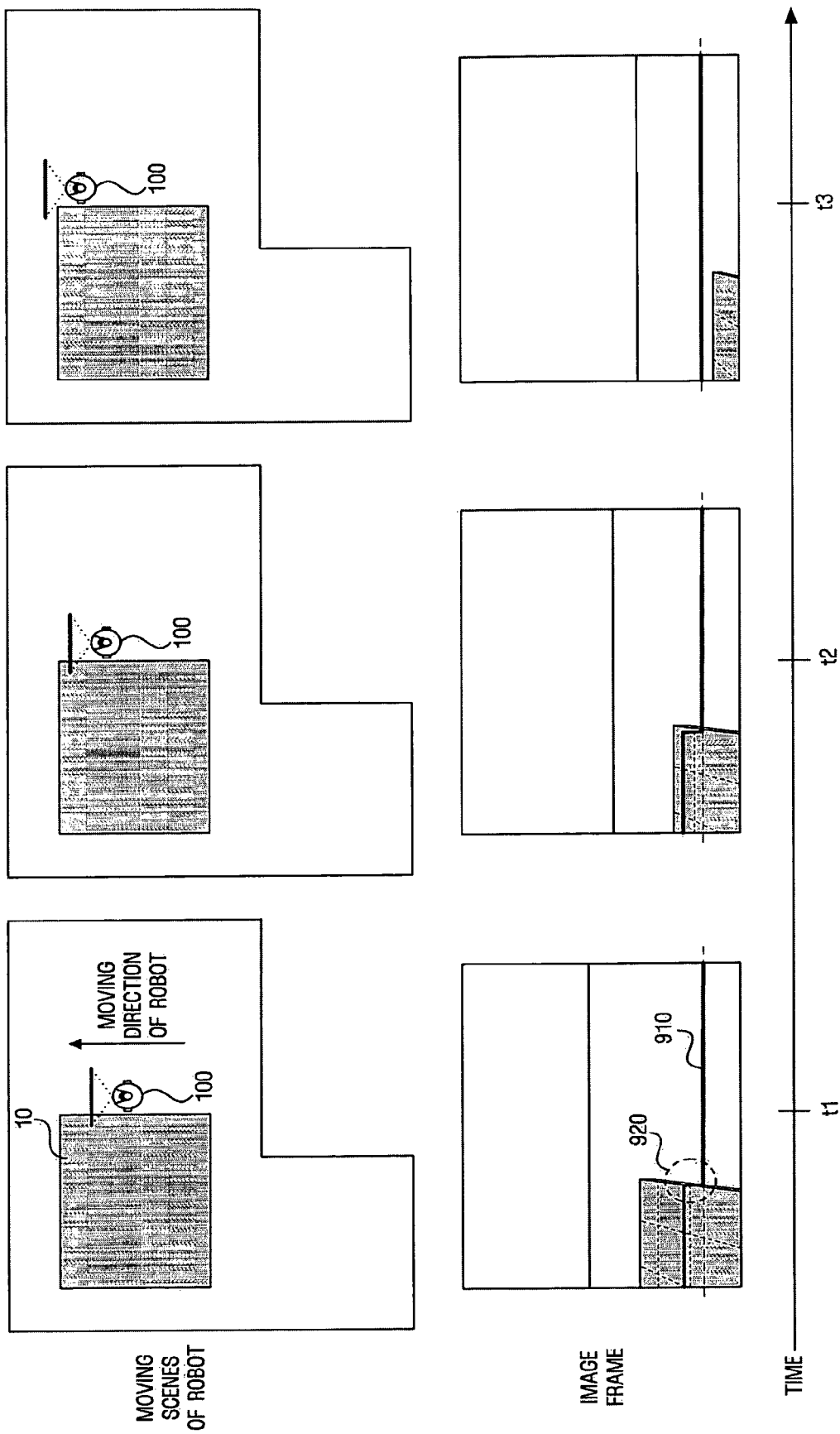

METHOD OF DETECTING OBJECT USING STRUCTURED LIGHT AND ROBOT USING THE SAME

CROSS-REFERENCE TO RELATED APPLICATION

This application is based on and claims priority from Korean Patent Application No. 10-2006-0044419, filed on May 17, 2006 in the Korean Intellectual Property Office, the disclosure of which is incorporated herein by reference.

BACKGROUND OF THE INVENTION

1. Field of the Invention

The present invention relates to a robot and, more particularly, to a method of detecting an object using a structured light and a robot using the same.

2. Description of Related Art

Generally, robots have been developed for use in industry as a part of factory automation or to perform tasks that are repetitive, dangerous, and/or difficult. Robot engineering has been directed to space applications as well as humanized robots for home use. In addition, robots are being installed inside of people to cure ailments that cannot be cured by existing medical devices. Such robot engineering has received much attention as the most advanced field that will substitute for the biotechnology field as the most popular after the information revolution based on the Internet.

An example of a robot for home use is a cleaning robot, which serves as a leading example of how heavy industry based robot engineering limited to industrial robots is being extended and transformed into light industry based robot engineering.

A cleaning robot generally includes a driving means for movement, a cleaning means for cleaning, and a monitoring means for sensing a front obstacle. The driving means includes a driving motor exerting a driving force, a caterpillar or wheel having a predetermined diameter, driven by the driving motor, and a driving control circuit controlling driving operation. The cleaning means includes a dust collector collecting dust to remove it, and a dust collecting control circuit controlling the dust collecting action. The monitoring means includes a monitoring camera for capturing a front obstacle, and a transmitter for transmitting an image captured by the monitoring camera to a user.

Such a robot senses an arrangement of obstacles existing in a peripheral area to set a movable area as a predetermined reference map, and moves to a destination without colliding with the obstacles in accordance with the set reference map. Since a floor object such as carpet or a rug does not disturb movement of the robot even though it is arranged on a moving path of the robot, it is likely that the reference map fails to reflect the presence of such a floor object. However, the floor object such as carpet or rug may affect a task of the robot. For example, as the floor object may be sucked into a brush of the cleaning robot, the operation of the cleaning robot may be stopped abnormally. Accordingly, a technique for detecting the presence of a floor object is required.

Korean Patent Unexamined Publication No. 10-2004-2162 discloses an apparatus and method for measuring a position using a laser, wherein a plurality of laser beams are generated and a relative position of a target is detected through images of points formed in the target by the beams to measure a distance to the target. However, this publication does not disclose a method of detecting a floor object, although a method of detecting an obstacle to set a reference map corresponding to a movable area of a robot is described.

BRIEF SUMMARY

An aspect of the present invention provides a method of detecting an object using a structured light and a robot using the same.

According to an aspect of the present invention, there is provided a method of detecting a floor object using a structured light which includes: measuring a height difference of a position onto which a predetermined structured light is projected from a reference position; and detecting the floor object using the measured height difference.

According to another aspect of the present invention, there is provided a robot, which includes: an imaging unit providing an image frame of an area onto which a predetermined structured light is projected; a traveling unit tracking a boundary of a floor object using an imaged position of the structured light in the image frame; and a detection unit detecting the floor object using a traveling path of the traveling unit.

According to another aspect of the present invention, there is provided a method of mapping an area in which a robot is movable, which includes: projecting a structured light toward a floor of the area; capturing an image frame of where the structured light is projected; determining whether an imaged position of the structured light in the image frame differs from a fixed position which is a position of the structured light in the image frame when the structured light is projected onto the floor; identifying a presence of an object when there is a difference in positions; and obtaining a size of the object and an area occupied by the object and updating a reference map with the obtained information.

According to another aspect of the present invention, there is provided a method of determining a presence of an object on a floor, which includes: projecting a structured light in a traveling direction and toward the floor; capturing an image frame including an imaged position of the projected structured light; and detecting a presence of the object on the floor based on the imaged position, an object being detected when a height of at least a portion of the imaged position is higher than a reference position which is a position of the projected structured light in the image frame when the structured light is projected on the floor.

According to other aspects of the present invention, there are provided computer-readable storage media encoded with processing instructions for causing a processor to execute the aforementioned methods.

Additional and/or other aspects and advantages of the present invention will be set forth in part in the description which follows and, in part, will be obvious from the description, or may be learned by practice of the invention

BRIEF DESCRIPTION OF THE DRAWINGS

Additional and/or other aspects and advantages of the present invention will be set forth in part in the description which follows and, in part, will be obvious from the description, or may be learned by practice of the invention:

FIG. 2A is a perspective view illustrating a robot according to an embodiment of the present invention;

FIGS. 4A and 4B illustrate a step of identifying the presence of a floor object according to an embodiment of the present invention;

FIG. 6 illustrates a process of measuring a boundary direction of a floor object according to an embodiment of the present invention;

FIG. 9 illustrates the state that a robot approaches a corner of a floor object according to an embodiment of the present invention;

DETAILED DESCRIPTION OF EMBODIMENTS

Figure 1:
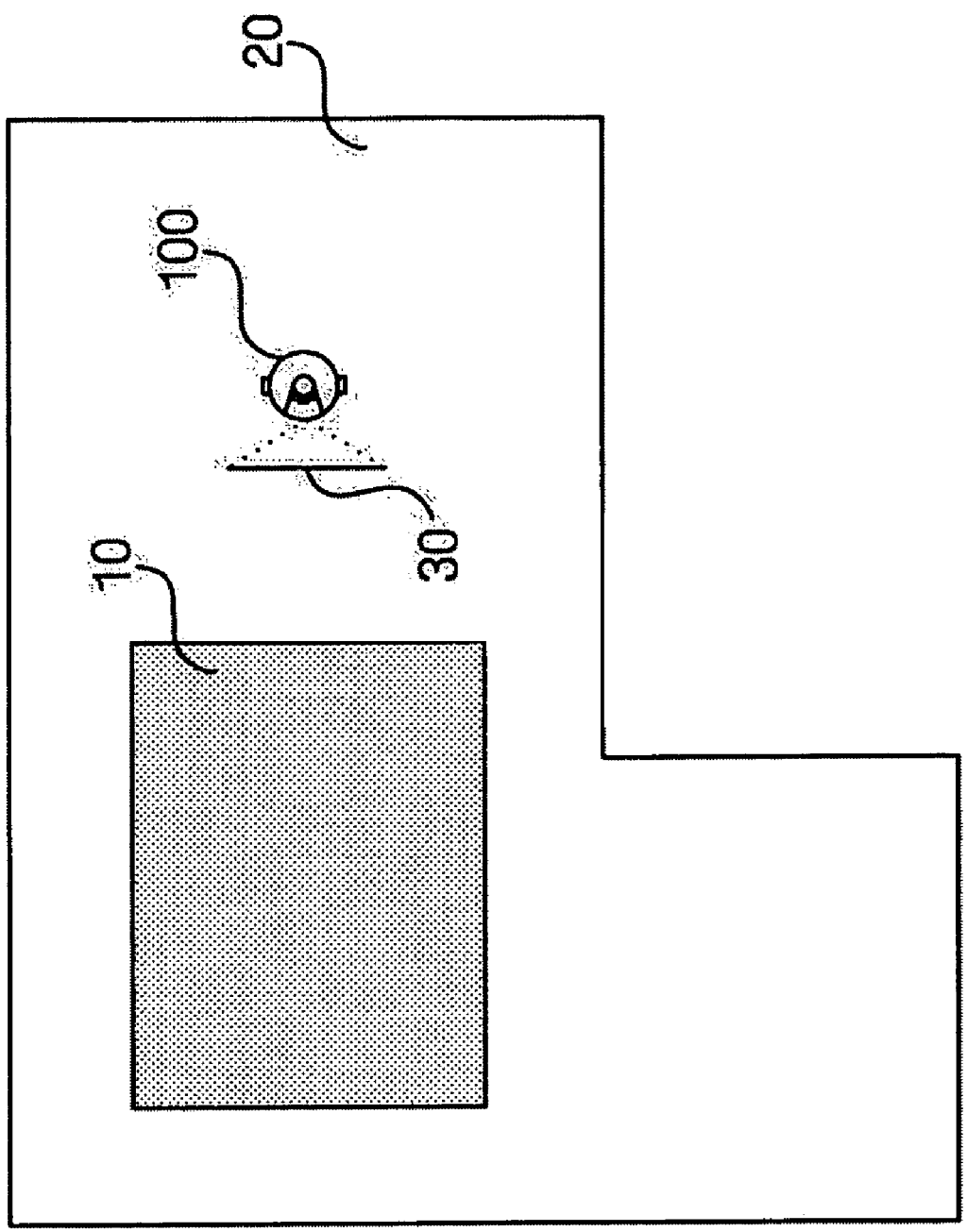
FIG. 1 illustrates the operation of a robot according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 illustrates the operation of a robot 100 according to an embodiment of the present invention.

The robot 100 according to the present embodiment executes predetermined tasks, and is automatically movable. A non-limiting example of such a robot is a cleaning robot. A floor object 10 may exist on a traveling path of the robot 100, as shown in FIG. 1. In a movable area 20 of the robot 100, there is a height difference between an area where the floor object 10 is located and an area where the floor object 10 is not located. Non-limiting examples of floor objects include various types of objects such as carpet, a rug, and a slipper, which may be present on the movable area 20 of the robot 100.

The robot 100 measures height differences on/of a floor during movement, and detects the floor object 10 through the measured height difference. To measure the height difference, the robot 100 projects a structured light 30 in a traveling direction and captures a projecting area of the structured light 30. The structured light 30 may be, by way of non-limiting examples, a single linear type, a plurality of linear types, and a matrix shaped linear type constituting a specified lattice. Hereinafter, the single linear type will be described as the structured light 30. However, it is to be understood that the structured light 30 is not limited to the single linear type described hereafter. The structured light 30 is downwardly projected toward a floor at a position spaced apart from the robot at a specified distance.

If the structured light 30 is projected toward and is incident on a floor (i.e., is projected on the floor), the position onto which it is projected is fixed on an image frame obtained by taking (capturing) an image of a projecting area of the structured light 30. However, if the structured light 30 is projected toward and is incident on a floor object 10 (i.e., is projected onto the floor object), an imaged position of the structured light 30 is higher than the fixed position. This is because a height difference occurs due to the floor object. Accordingly, it is necessary to experimentally set a reference position where the structured light 30 is on the image frame if the structured light 30 is projected onto the floor. And, the presence of the floor object 10 can be identified through comparison between the position of the structured light 30 on the image frame taken during the operation of the robot 100 and the reference position.

If the presence of the floor object 10 is sensed, the robot 100 tracks a boundary of the floor object 10 to identify the size of the floor object 10 and the area where the floor object 10 is located. Therefore, the area where the floor object 10 is positioned and a working method of the robot for a floor are set or the work of the robot 100 is selectively set. In this way, the operation of the robot required for the floor object 10 can be set and controlled in advance. For example, if the robot 100 is for cleaning, a cleaning mode for the floor and a cleaning mode for the floor object 10 can separately be set or only the cleaning mode for the floor object 10 can be set. Hereinafter, the aforementioned robot 100 will be described in more detail with reference to FIGS. 2A and 2B.

Figure 2B:
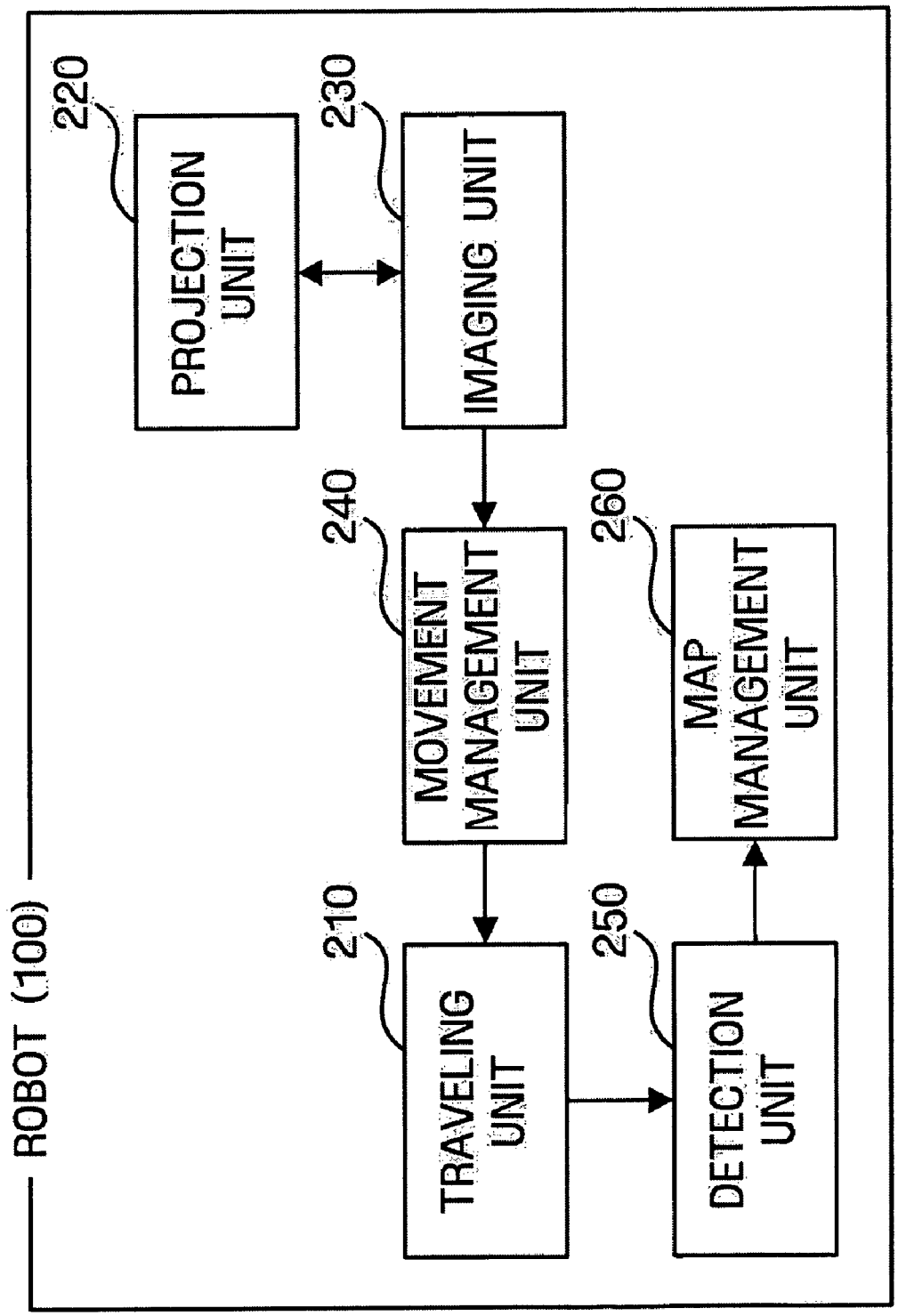
FIG. 2B is a block diagram illustrating the construction of a robot according to an embodiment of the present invention.

FIG. 2A is a perspective view illustrating the robot 100 according to an embodiment of the present invention, and FIG. 2B is a block diagram illustrating a structure of the robot 100 according to an embodiment of the present invention. The robot 100 includes a traveling unit 210, a projection unit 220, an imaging unit 230, a movement management unit 240, a detection unit 250, and a map management unit 260. Referring to FIG. 2A, the projection unit 220 is positioned above the imaging unit 230. However, it is to be understood that the arrangement structure of the projection unit 220 and the imaging unit 230 of the present embodiment is not limited to the structure of FIG. 2A.

The traveling unit 210 moves the robot 100. To this end, the traveling unit 210 includes one or more wheels 212 and a motor (not shown) rotating the wheels 212. However, the traveling unit 210 may include other known mans for traveling.

The projection unit 220 projects the structured light 30. As described above, the structured light 30 can be a single linear type, a plurality of linear types or a matrix shaped linear type, and is downwardly projected toward the front of the robot 100. A line laser is a non-limiting example of the structured light. The line laser can be a light-emitting diode that emits laser beams, and an optical system, such as a lens, a mirror, and a prism, which disperses the laser beams emitted from the light-emitting diode. The projection unit 220 can project the structured light periodically, intermittently, or continuously.

The imaging unit 230 takes an image of the area where the structured light is projected, so as to provide the image frame of the structured light. The imaging unit 230 may provide the image frame periodically. And, the imaging unit 230 can synchronize with the projection unit 220. In other words, the imaging unit 230 can take images of the structured light at the time when the projection unit 220 projects the structured light. Non-limiting examples of the imaging unit 230 include a charge coupled device, a complementary metal-oxide semiconductor (CMOS), and a single-carrier modulation photo detector (SMPD).

The movement management unit 240 controls a moving direction of the robot 100. Accordingly, the traveling unit 210 moves the robot 100 under the control of the movement management unit 240. Particularly, the movement management unit 240 can control the moving direction of the robot 100 to allow the robot 100 to approach the floor object using the structured light in the image frame provided from the imaging unit 230 and to track the boundary of the floor object. The movement management unit 240 will be described later with reference to FIG. 3.

The detection unit 250 detects the floor object based on a moving path of the robot 100, which is obtained by tracking the boundary of the floor object. In the present embodiment, detection of the floor object means that the area occupied by the floor object is set and the size of the floor object is measured. To identify the moving path of the robot 100, the detection unit 250 includes an encoder, a gyroscope, and the like, which can measure the position of the robot 100 and directional variation of the robot 100.

The detection unit 250 can categorize types of the floor object through the size of the floor object. By way of a non-limiting example, the detection unit 250 can categorize the floor object having a size greater than 1 m*1 m into a carpet type and the floor object having a size less than 0.5 m*0.5 m into a slipper type. In this way, the work type of the robot can be categorized depending on the type of the floor object.

A boundary measurement unit 244 can use color information to measure the boundary of the floor object. By way of a non-limiting example, if the presence of the floor object is sensed through the structured light in the image frame, the boundary measurement unit 244 obtains a differential value between color information of the floor object and color information of the floor and compares an absolute value (hereinafter referred to as "initial chroma difference") of the obtained differential value with a specified threshold value. The color information of the floor object can be obtained by sampling the area, where the floor object seems to be located, in the image frame, and analyzing color information of the sampled area.

If the initial chroma difference exceeds a first threshold value, the boundary measurement unit 244 divides the image frame into an area having a color showing a difference value less than a second threshold value in comparison with the color information of the floor object and an area having a color showing a difference value greater than the second threshold value in comparison with the color information of the floor object. Thus, the boundary measurement unit 244 can measure the boundary of the floor object.

Then, a boundary direction of the floor object can be determined by a weighted sum of a boundary direction of the floor object obtained using the structured light and a boundary direction of the floor object obtained using the color information. This can be expressed by the following equation 1.

$$\vec{C} = k\vec{A} + (1-k)\vec{B} \qquad \text{[Equation 1]}$$

In equation 1, $\vec{A}$ represents the boundary direction of the floor object obtained using the structured light, $\vec{B}$ represents the boundary direction of the floor objected obtained using the color information, and $\vec{C}$ represents the boundary direction of the floor object according to the weighted sum. Also, k represents the weight value, and can be set in advance depending on the reliability of $\vec{A}$ and $\vec{B}$, or can be set dynamically depending on the measurement results of $\vec{A}$ and $\vec{B}$. By way of a non-limiting example, the weight value k can be set as a value obtained by dividing the initial chroma difference by the maximum chroma value 255 of the image frame.

The map management unit 260 updates the reference map showing the movable area of the robot 100 to reflect the presence of the floor object detected by the detection unit 260. In this case, the reference map represents an arrangement structure of obstacles that obstruct or hinder movement of the robot 100, and can be prepared in advance. Since various techniques for preparing the reference map are known, description thereof will be omitted. The map management unit 260 can obtain detection information, such as the size of the floor object, its area, its material, and its type, from the detection unit 250, and updates the reference map to reflect the detection information.

Figure 3:
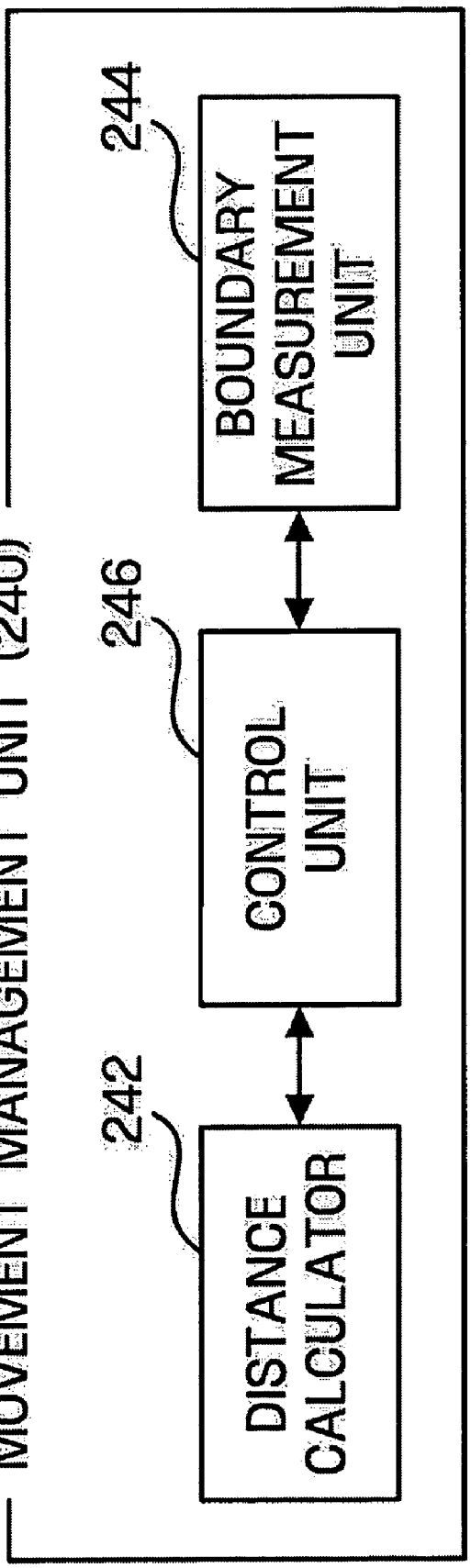
FIG. 3 is a block diagram illustrating the construction of a movement management unit of FIG. 2.

FIG. 3 is a block diagram illustrating the movement management unit 240 of FIG. 2. The movement management unit 240 includes a distance calculator 242, the boundary measurement unit 244, and a control unit 246.

If a height difference is sensed through the structured light in the image frame provided from the imaging unit 30 of FIG. 1, the distance calculator 242 determines that the floor object exists, and calculates the distance from the current position of the robot 100 of FIG. 1 to the floor object. As described above, the height difference of the floor can be determined through the position of the structured light on the image frame. If the structured light projected by the projection unit 220 of FIG. 2A is projected on the floor, the position where the structured light is in the taken image frame is uniformly maintained.

Accordingly, if the structured light is projected on the floor, the reference position where the structured light is located in the image frame provided from the imaging unit 230 of FIG. 2A is stored in advance and then compared with the position where the structured light is located in the taken image frame, whereby the presence of the floor object can be identified. The process of identifying the presence of the floor object will be described with reference to FIGS. 4A and 4B.

FIG. 4A temporally illustrates scenes of the robot 100 moving in a direction vertical to the boundary of the floor object 10 and image frames taken by the imaging unit 230 for the respective scenes. Referring to FIG. 4A, if the structured light 30 is projected on the floor as shown in t1 and t2, the position of a structured light 30a existing in the image frame is the same as the reference position 410. However, if the structured light 30 is projected on the floor object 10 as shown in t3, the position of the structured light 30a existing in the image frame is higher than the reference position 410. In this case, the detection unit 250 can determine that the floor object 10 exists in the front.

FIG. 4B temporally illustrates scenes of the robot 100 moving in a direction oblique to the boundary of the floor object 10 and image frames taken by the imaging unit 230 for the respective scenes. Referring to FIG. 4B, if the structured light 30 is projected on the floor as shown in t1 and t2, the position of the structured light 30a existing in the image frame is the same as the reference position 410. However, if the structured light 30 is projected on the floor object 10 as shown in t3, the position of the structured light 30a existing in the image frame taken by the imaging unit 230 has a step difference 420. For the structured light 30a having the step difference 420, the portion taken on the reference position 410 represents the floor, and the portion higher than the reference position 410 represents the floor object 10.

If a height difference is sensed through the position of the structured light in the image frame, the distance calculator 242 determines that the floor object exists in the area where the structured light is projected, and calculates the moving distance from the current position of the robot 100 to the floor object and the moving direction. This will be described with reference to FIGS. 5A to 5C.

Figure 5A:
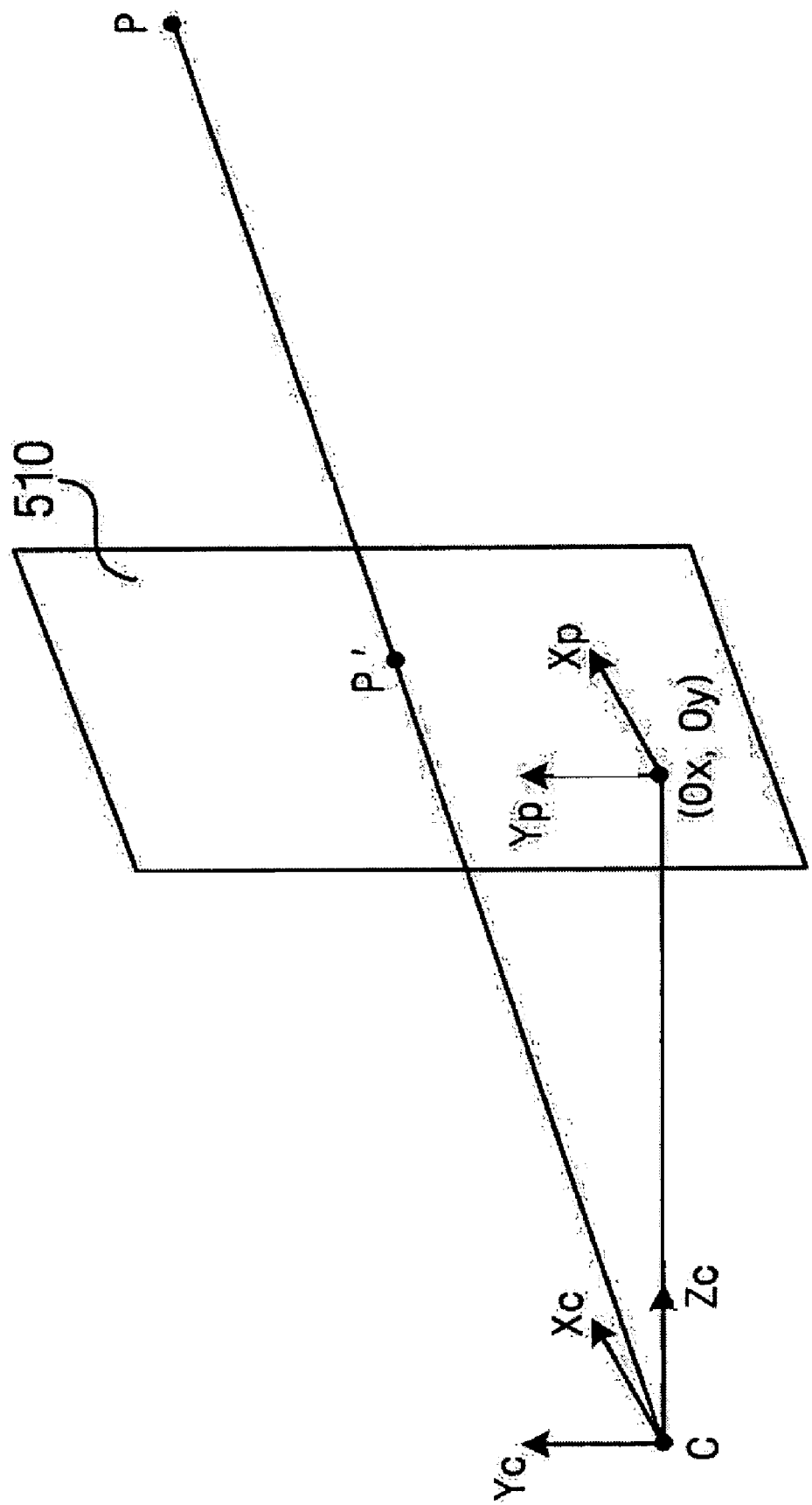
FIGS. 5A to 5C illustrate a method of calculating a moving distance and a moving direction from a robot to a floor object according to an embodiment of the present invention.

FIG. 5A illustrates a coordinate relation between the imaging unit 230 of FIG. 2A and a target position according to an embodiment of the present invention. Referring to FIG. 5A, coordinate axes Xc, Yc and Zc are reference coordinate axes used by the imaging unit 230 on the robot 100, and are arranged round a reference point C. Ox and Oy are reference points corresponding to the coordinate axis Zc of the imaging unit 230 among coordinates of the image frame 510, and Yp and Xp are reference coordinate axes of the image frame 510. A point P represents a target point, and P' represents the position where the target point P is in the taken image frame 510.

In the present embodiment, the target point represents the position where the structured light is projected. The target point may correspond to the central point of the structured light if the structured light in the image frame has no step difference. Also, the target point may be the position corresponding to the step difference if the structured light in the image frame has the step difference.

Figure 5B:
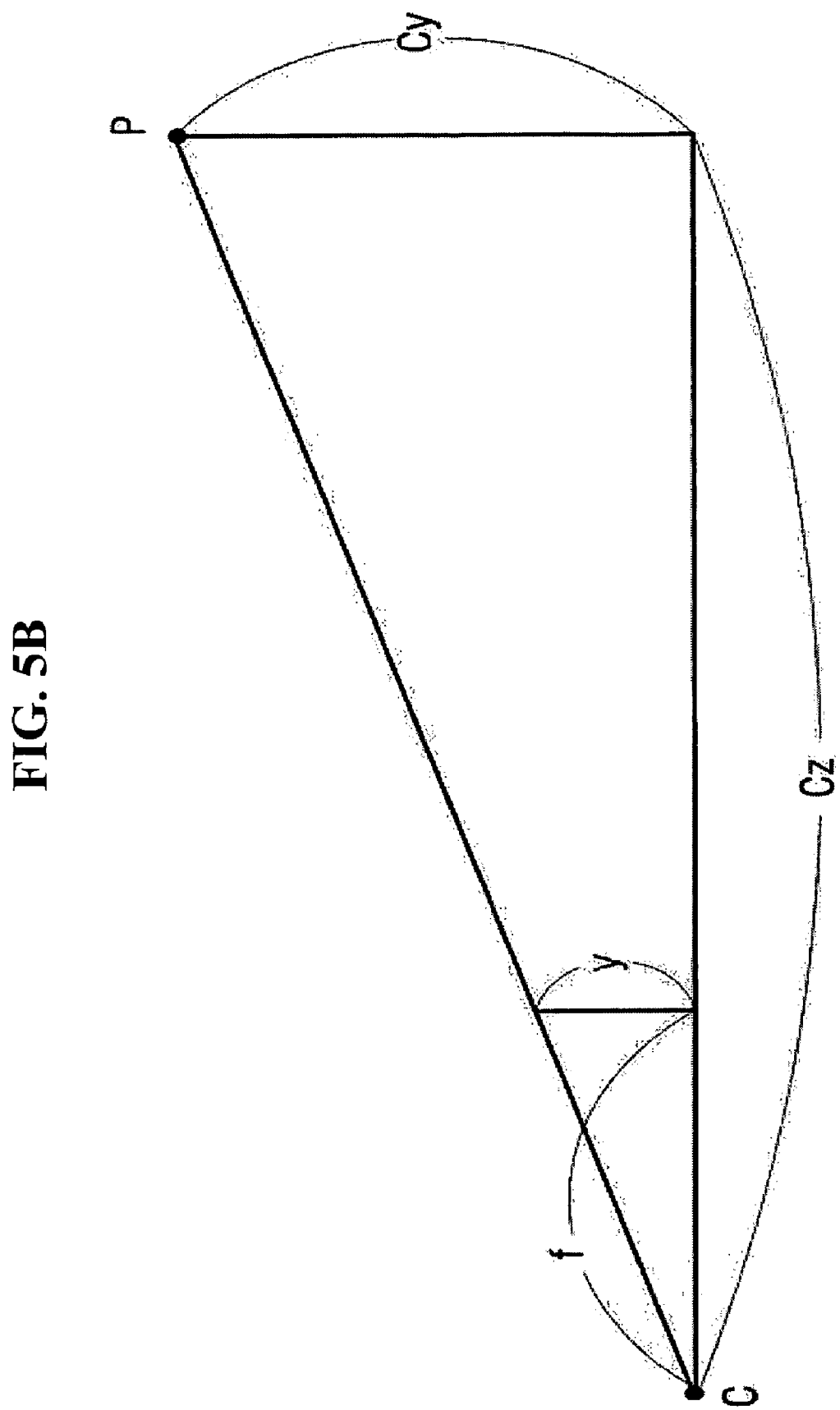

FIG. 5B illustrates a relation between the distance Cz in the Zc axis direction from the imaging unit 230 to the target point P and the distance Cy in the Yc axis direction from the imaging unit 230 to the target point P in the coordinate relation of FIG. 5A. In FIG. 5B, f is a focal distance of the imaging unit 230, and y is a distance in the Yc axis direction, where the image of the target point P is formed in the focal distance f. In this case, y can be expressed by the following equation 2.

$$y = y_s \times s_y \quad \text{[Equation 2]}$$

In equation 2, $y_s$ is the distance of the position P' where the target point P is in the image frame 510, which is spaced apart from the reference points Ox and Oy of the image frame in the Yp axis direction. $s_y$ is a scale parameter for compensating a distortion level in the Yc axis direction depending on the work of the imaging unit 230 and the size of the image frame 510.

The relation between Cy and Cz is obtained by the following equation 3 by trigonometry according to the relation shown in FIG. 5B and equation 2.

$$C_y = y \times \frac{C_z}{f} = y_s \times C_z \times \frac{s_y}{f} \quad \text{[Equation 3]}$$

Similarly, the relation between the distance Cz in the Zc axis direction from the imaging unit 230 to the object and the distance Cx in the Xc axis direction from the imaging unit 230 to the object can be obtained. The following equation 4 illustrates determinants showing the relation between Cx and Cz and the relation between Cy and Cz.

$$\begin{pmatrix} C_x \\ C_y \end{pmatrix} = \begin{pmatrix} x_s \cdot \frac{s_x}{f} \\ y_s \cdot \frac{s_y}{f} \end{pmatrix} \cdot C_z \quad \text{[Equation 4]}$$

In equation 4, $s_x$ is a scale parameter for compensating a distortion level in the Xc axis direction depending on the work of the imaging unit 230 and the size of the image frame 510.

Figure 5C:
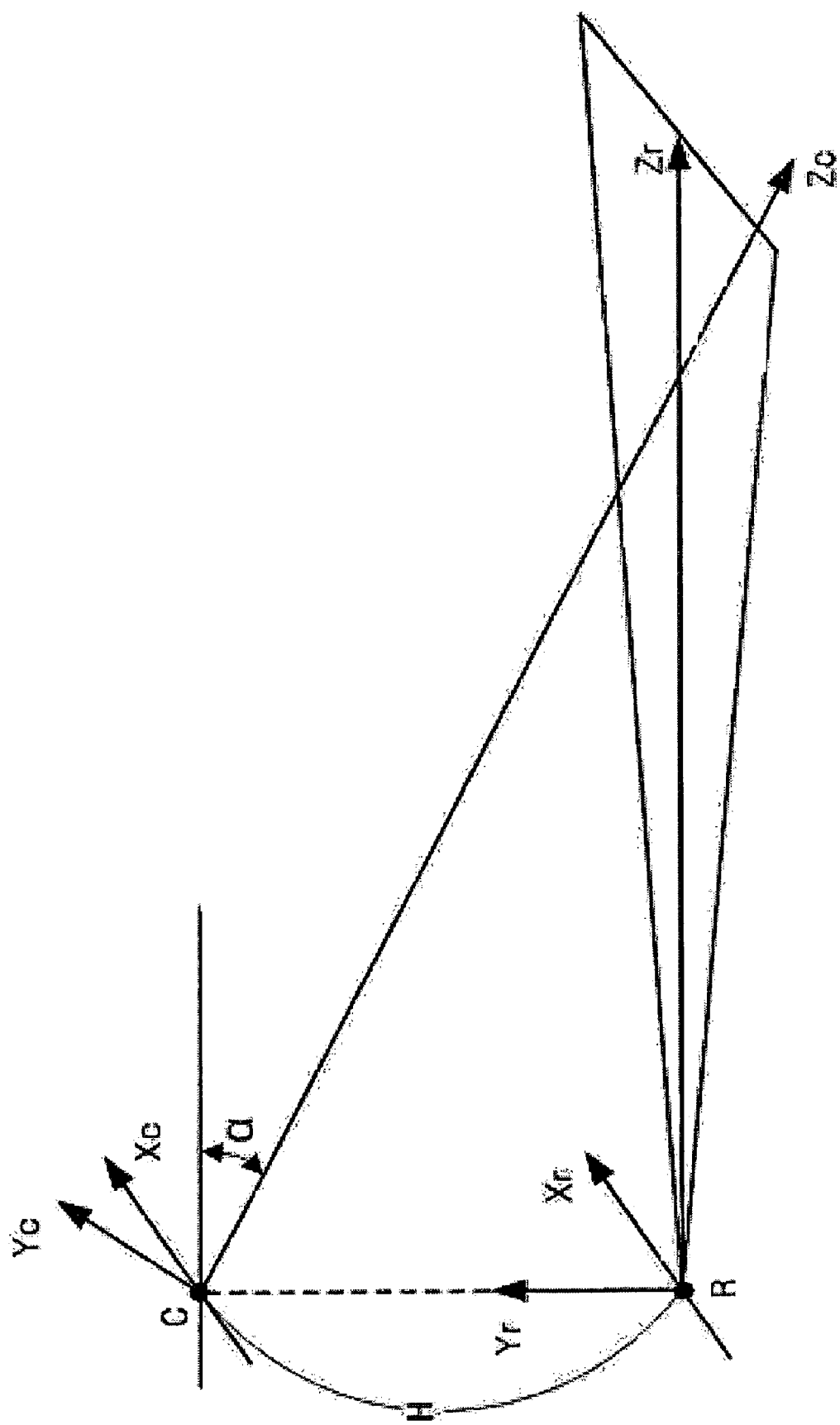

FIG. 5C illustrates a coordinate relation between a reference coordinate axis of the imaging unit 230 and a reference coordinate axis of the robot 100 according to an embodiment of the present invention.

Referring to FIG. 5C, coordinate axes Xr, Yr and Zr are reference coordinate axes of the robot 100, and Xc, Yc and Zc are reference coordinate axes of the imaging unit 230. The reference coordinate axes of the imaging unit 230 are the same as those of FIG. 5A. C and R respectively represent reference points showing the reference coordinate axis of the robot 100 and the reference coordinate axis of the imaging unit 230.

Among the reference coordinate axes of the robot 100, a plane of Xr and Zr is the same as a floor plane where the robot moves, and Zr is oriented toward the front of the robot. In the embodiment of the present invention, Xr and Xc are parallel with each other, and the reference point C of the imaging unit 230 is spaced apart from the reference point R of the robot 100 in the Yr axis direction by H. Also, Zc is rotated with respect to Zr at an angle of $\alpha$.

In this case, the relation between a coordinate system based on the reference coordinate axis of the robot 100 and a coordinate system based on the reference coordinate axis of the imaging unit 230 can be expressed by the following equation 5.

$$\begin{pmatrix} R_x \\ R_y \\ R_z \end{pmatrix} = \begin{pmatrix} 1 & 0 & 0 \\ 0 & \cos\alpha & -\sin\alpha \\ 0 & \sin\alpha & \cos\alpha \end{pmatrix} \begin{pmatrix} C_x \\ C_y \\ C_z \end{pmatrix} + \begin{pmatrix} 0 \\ H \\ 0 \end{pmatrix} \quad \text{[Equation 5]}$$

In equation 5, Rx, Ry and Rz respectively mean distances from the reference point R of the robot 100 to Xr, Yr and Zr directions, and Cx, Cy and Cz respectively mean distances from the reference point R of the imaging unit 230 to Xc, Yc and Zc directions.

The relation of $R_y = (\cos\alpha \cdot C_y - \sin\alpha \cdot C_z) + H$ is obtained using equation 5. In this case, the following equation 6 can be obtained by substituting the relation between Cy and Cz obtained by equation 4 for the above relation when Ry=0 is made for XrZr plane corresponding to the moving plane of the robot 100.

$$C_z = \frac{H}{\sin\alpha - \cos\alpha \cdot y_s \cdot \frac{s_y}{f}} \quad \text{[Equation 6]}$$

The distances Rz and Rx in the Zr and Xr axis directions from the robot 100 to the target point can be obtained by equations 5 and 6. Rz and Rx can be obtained by the following equations 7 and 8.

$$R_z = \sin\alpha \cdot C_y + \cos\alpha \cdot C_z = H \cdot \frac{\sin\alpha \cdot y_s \cdot \frac{s_y}{f} + \cos\alpha}{\sin\alpha - \cos\alpha \cdot y_s \cdot \frac{s_y}{f}} \quad \text{[Equation 7]}$$

$$R_x = x_s \cdot \frac{s_x}{f} \cdot C_z = \frac{H \cdot x_s \cdot \frac{s_y}{f}}{\sin\alpha - \cos\alpha \cdot y_s \cdot \frac{s_y}{f}} \quad \text{[Equation 8]}$$

Since the distance calculation methods described with reference to FIGS. 5A to 5C and equations 2 to 8 are merely non-limiting examples, the present embodiment is not limited to such distance calculation methods and various other methods can be used.

The height difference from the floor to the position where the structured light is projected can directly be calculated by the aforementioned distance calculation methods.

Referring to FIG. 3 again, the boundary measurement unit 244 measures the boundary direction of the floor object. The boundary direction of the floor object can be measured through an extension direction of step differences of the structured light existing in the consecutive image frames provided form the imaging unit 230 while the robot 100 is rotated when the robot 100 is positioned within a certain distance from the floor object. For example, as shown in FIG. 6, if four temporally consecutive image frames are generated while the robot 100 is rotated clockwise in the vicinity of the boundary of the floor object 10, the distance calculator 242 can calculate the distance and the direction from the current position of the robot 100 to the position corresponding to the point where step differences 610, 620, 630 and 640 of the structured light exist in the respective image frames. At this time, the boundary measurement unit 244 can measure the boundary direction of the floor object by generating coordinates of the points where the step differences exist and connecting the generated coordinates with one another.

The control unit 246 determines the moving direction of the robot 100 or the rotational direction of the robot 100 using the information provided from the distance calculator 242 and the boundary measurement unit 244, and controls the traveling unit 210 through the determined result.

Hereinafter, operations of a process of detecting a floor object will be described in detail.

Figure 7:
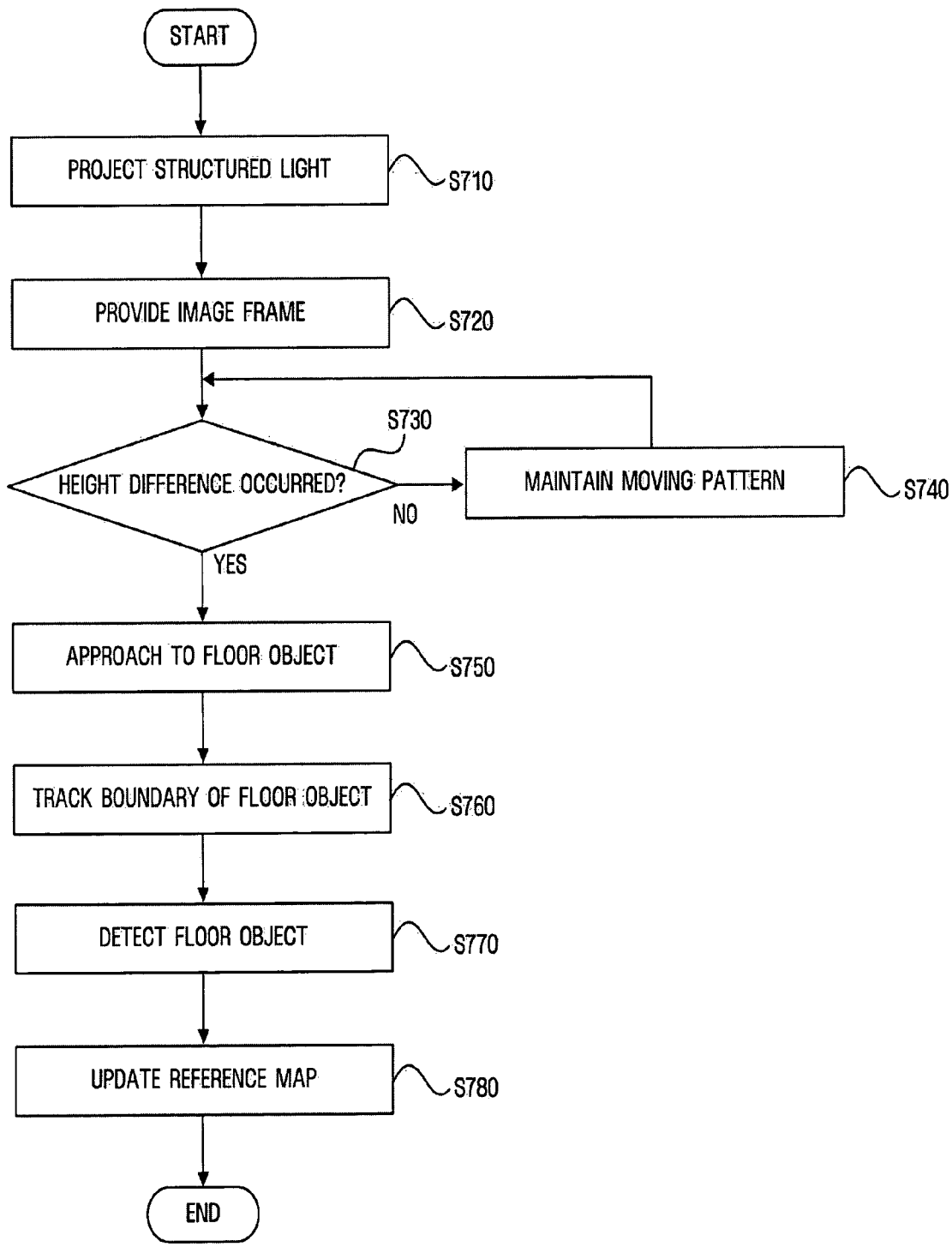
FIG. 7 is a flowchart illustrating a process of detecting a floor object according to an embodiment of the present invention.

FIG. 7 is a flowchart illustrating the operations of detecting a floor object according to an embodiment of the present invention. The method is described with concurrent reference to the robot of FIGS. 1-6B, for ease of explanation only.

First, if the projection unit 220 projects the structured light (operation S710), the imaging unit 230 takes the area where the structured light is projected and provides the image frame taken by the imaging unit 230 (operation) S720. The structured light can be projected periodically, and the imaging unit 230 synchronizes with the projection unit 220, whereby the imaging unit 230 can take the area where the structured light is projected whenever the structured light is projected. In the flowchart of FIG. 7, although operations S710 and S720 are illustrated as being executed once, these operations are repeated while later operations are executed.

The movement management unit 240 determines whether there is a height difference of the position of the structured light in the image frame (operation S730) compared to the reference position in the image frame when the structured light is projected onto the floor. Whether the height difference has been generated due to the floor object can be determined through the process described with reference to FIGS. 4A and 4B. Also, based on the description referring to FIGS. 5A to 5C and equations 2 to 8, the height difference can be sensed by calculating the height of the point corresponding to the position of the structured light existing in the image frame.

If there is no height difference, the traveling unit 210 maintains the current moving pattern of the robot 100 under the control of the movement management unit 240 (operation S740). However, as a result of operation S730, if the height difference of the floor is sensed, the traveling unit 210 moves the robot 100 toward to the floor object under the control of the movement management unit 240 (operation S750). At this time, the robot 100 continues to move until it is positioned within a specified distance from the boundary of the floor object, and the distance and direction from the robot 100 to the boundary of the floor object can be calculated by the distance calculator 242 as described with reference to FIG. 5A to FIG. 5C.

If the robot 100 continues to move until it is positioned at the specified distance from the boundary of the floor object, the movement management unit 240 controls the traveling unit 210 to allow the robot 100 to track the boundary of the floor object, and the traveling unit 2120 moves the robot 100 along the boundary of the floor object under the control of the movement management unit 240 (operation S760).

If the boundary of the floor object is completely tracked, the detection unit 250 detects the floor object using the moving path of the robot 100 along the boundary of the floor object (operation S770). At this time, the detection unit 250 can categorize the type of the floor object using the size of the floor object.

The map management unit 260 updates the reference map showing the movable area of the robot 100 to reflect the presence of the floor object (operation S780).

Figure 8:
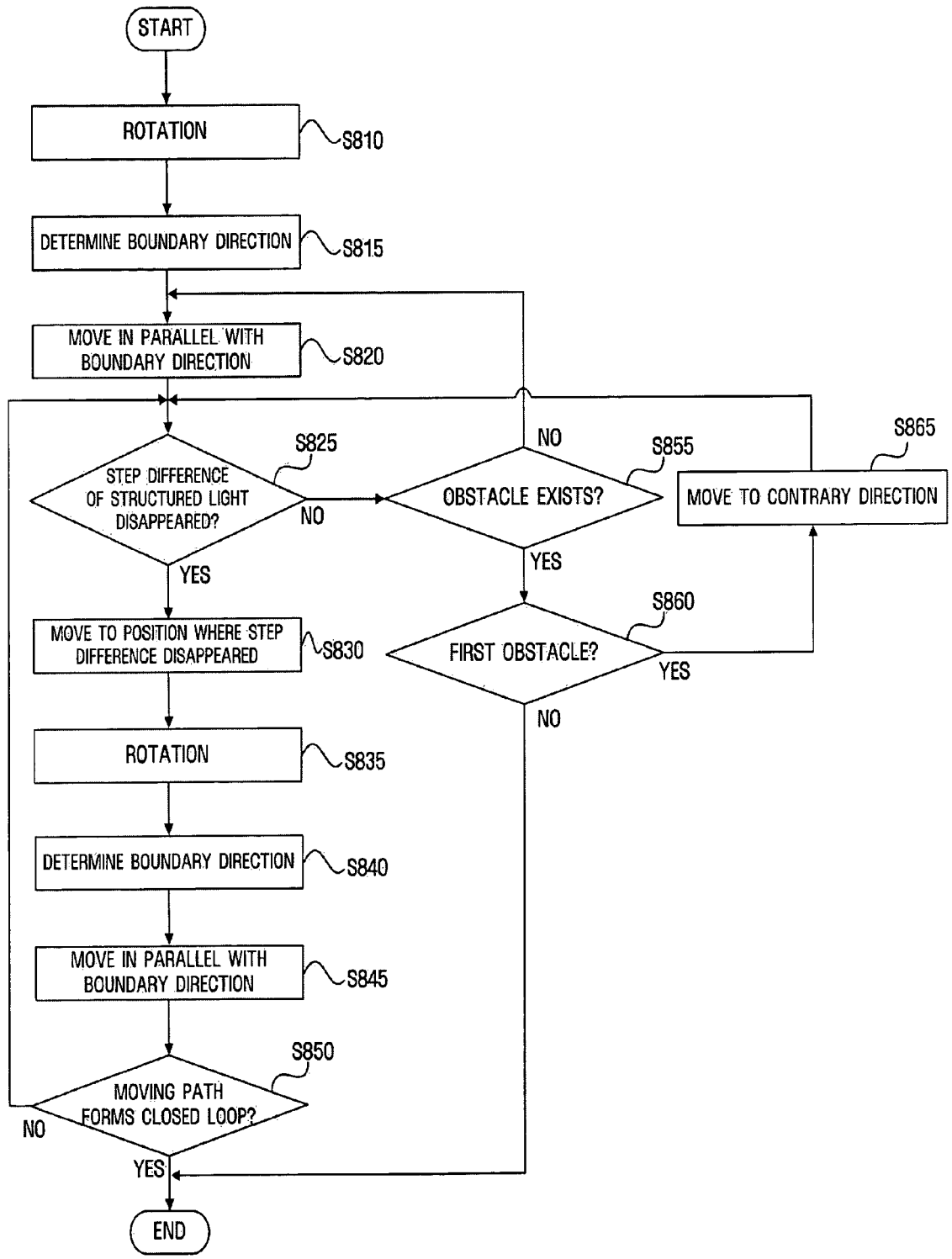
FIG. 8 is a flowchart illustrating an operation of tracking a boundary of a floor object according to an embodiment of the present invention.

FIG. 8 is a flowchart illustrating a process of tracking the boundary of a floor object according to an embodiment of the present invention. The flowchart of FIG. 8 illustrates operation S760 of FIG. 7 in more detail.

First, if the robot approaches the specified distance from the floor object, the control unit 246 instructs the traveling unit 210 to change the rotational direction of the robot, and the traveling unit 240 rotates the robot 100 in the direction instructed by the control unit 246 (operation S810).

Image frames taken of the structured light are periodically provided by the operation of the projection unit 220 and the imaging unit 230 while the robot 100 is rotated. The boundary measurement unit 244 determines the boundary direction of the floor object by analyzing the consecutively provided image frames (operation S815).

If the boundary direction of the floor object is determined, the control unit 246 determines a moving direction in parallel with the boundary direction of the floor object, and the traveling unit 240 moves the robot 100 to the direction determined by the control unit 246 (operation S820).

The robot 100 can encounter two situations while moving along the boundary of the floor object. One of the situations is that the robot 100 approaches the corner of the floor object, and the other one is that the robot 100 confronts an obstacle. Each possibility is addressed in turn.

First, if the robot 100 approaches the corner of the floor object, the step difference of the structured light disappears from the image frame provided by the imaging unit 230. FIG. 9 illustrates scenes of the robot 100 approaching to the corner of the floor object 10 and image frames corresponding to the respective scenes. In t3 of FIG. 9, the step difference 920 of the structured light 910 disappears.

While the robot 100 is moving along the boundary direction of the floor object, the control unit 246 determines whether the step difference of the structured light disappears from the image frame provided by the imaging unit 230 (operation S825). If the step difference of the structured light disappears from the image frame, it means that the robot has reached the corner of the floor object. Accordingly, the control unit 246 instructs movement of the robot 100 to the position where the step difference disappears, and the traveling unit 210 moves the robot 100 according to the instructions of the control unit 246 (operation S830).

If the robot 100 moves to the position where the step difference disappears, the control unit 246 instructs rotation of the robot 100 and the traveling unit 210 rotates the robot 100 (operation S835). In this case, the rotational direction of the robot 100 corresponds to the existing direction of the floor object. For example, if the robot 100 moves along the boundary of the floor object while sensing the step difference shown in FIG. 9, it is noted from the structured light that the floor object exists in the left direction of the robot 100. In this case, the control unit 246 instructs rotation of the robot 100 in the left direction.

While the robot 100 is rotating, the boundary measurement unit 244 again determines the boundary direction of the floor object through the image frame provided from the imaging unit 230 (operation S840). Then, the traveling unit 210 moves the robot 100 in a direction parallel with the boundary direction of the floor object determined by the boundary measurement unit 244 (operation S845). Operations S835 to S845 are executed similarly to operations S810 to S820.

While the robot 100 is moving along the boundary direction of the floor object, the control unit 246 determines whether the moving path of the robot 100 forms a closed loop (operation S850) in accordance with the tracking operation of the floor object. If the moving path of the robot 100 forms the closed loop, the tracking operation of the floor object ends.

Meanwhile, while the robot 100 is moving along the boundary direction of the floor object, the control unit 246 determines whether an obstacle exists in the front of the robot 100 (operation S855). If the height of the structured light exceeds the threshold value in the image frame provided by the imaging unit 230, the control unit 246 determines that the obstacle exists. This is shown in FIGS. 10A and 10B.

Figure 10A:
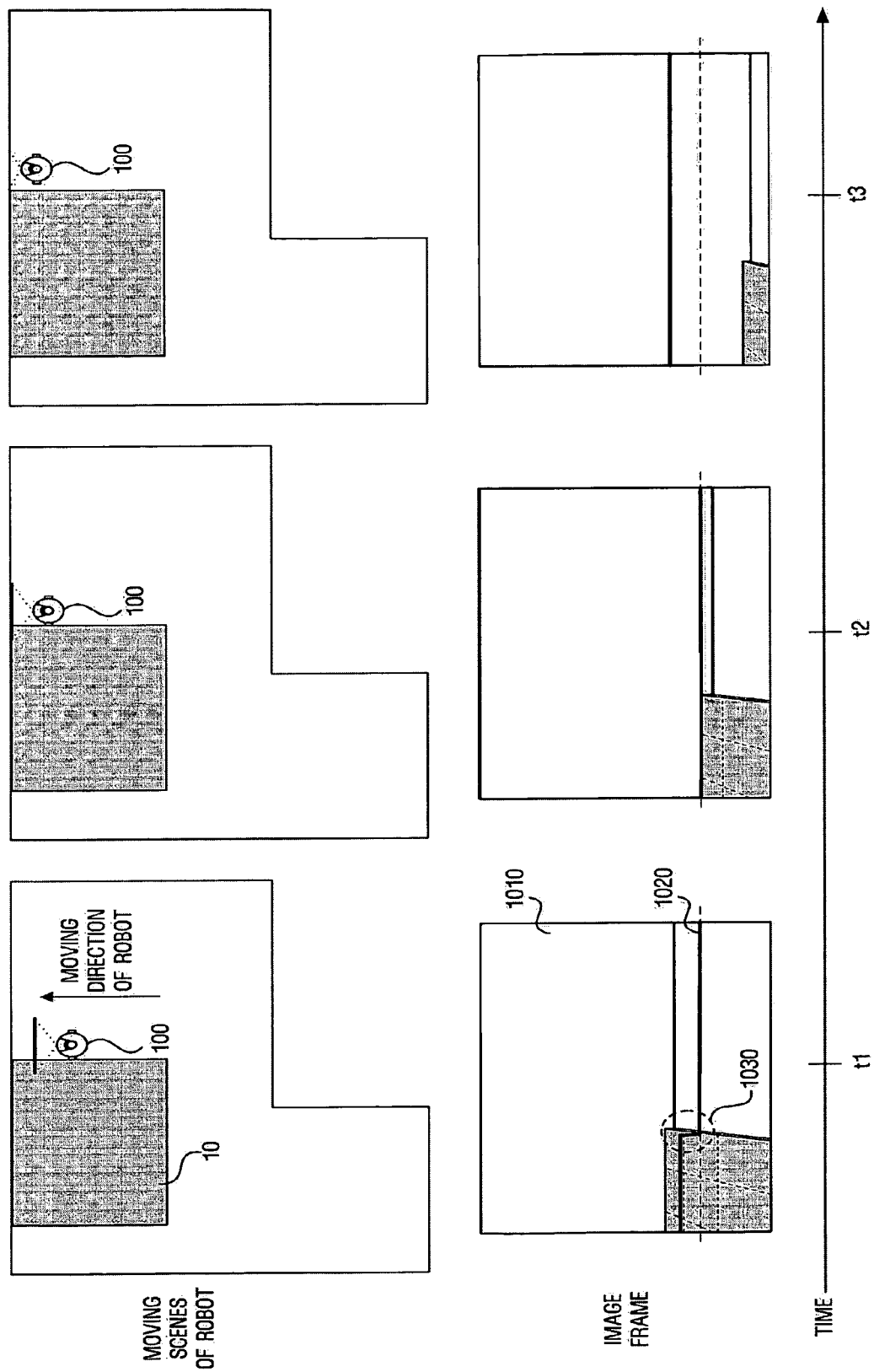
FIGS. 10A and 10B illustrate when a robot approaches an obstacle in contact with a floor object according to an embodiment of the present invention.

FIG. 10A illustrates scenes of the robot 100 approaching the obstacle 10 and image frames corresponding to the respective scenes. As shown in FIG. 10A, if the robot 100 approaches the obstacle when the floor object is in contact with the obstacle, the structured light is projected onto the obstacle. At this time, the step difference 1030 of the structured light 1020 disappears from the image frame (see t2), and the taken position of the structured light 1020 becomes higher (see t3). The control unit 246 can identify the presence of the obstacle if the taken position of the structured light exceeds a specified height.

Figure 10B:
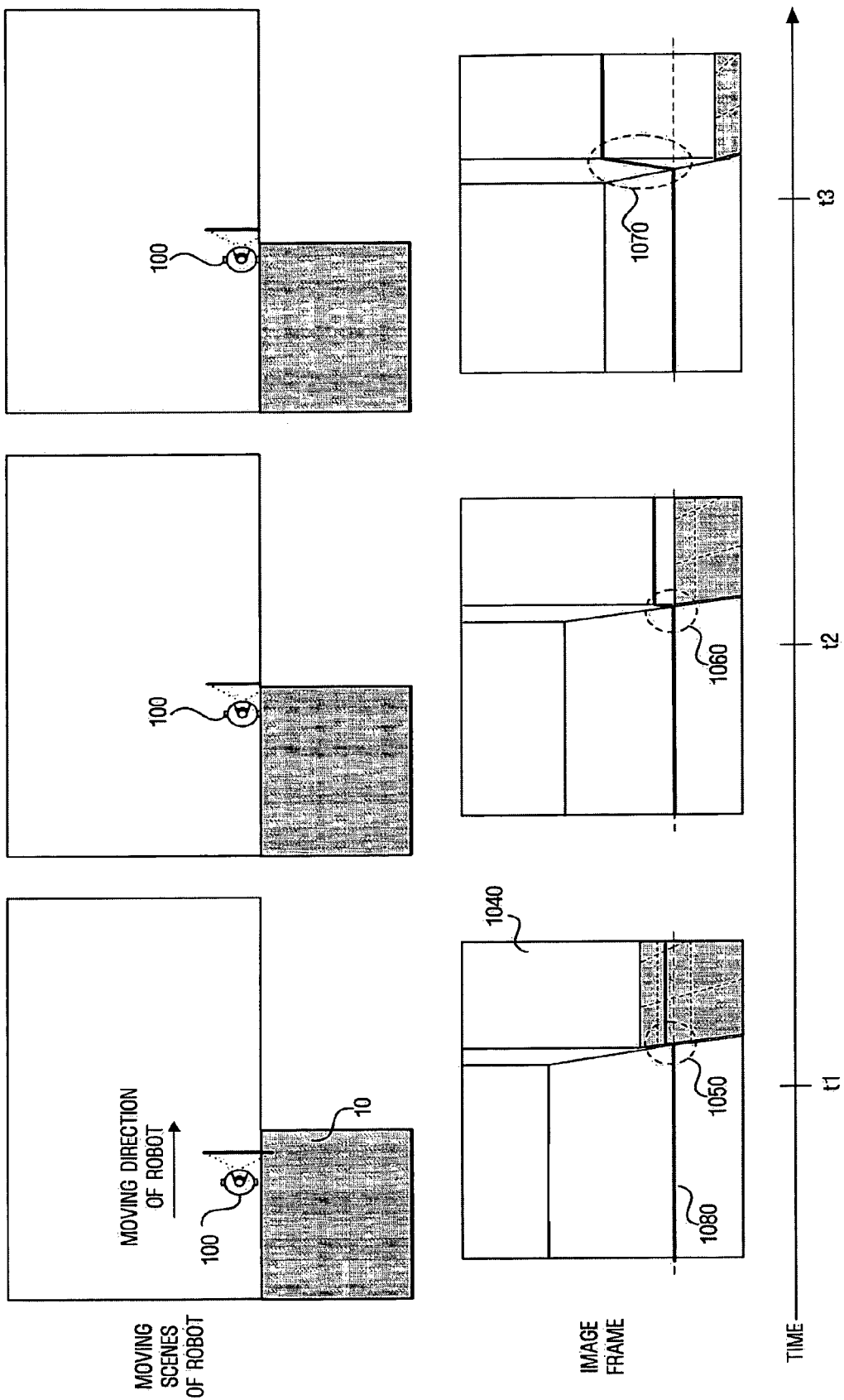

FIG. 10B illustrates scenes of the robot 100 approaching to the obstacle and image frames corresponding to the respective scenes. As shown in FIG. 10B, if the robot 100 approaches the obstacle in the same state as that of FIG. 10B, the structured light 1080 is projected onto the obstacle 1040 and the floor. In this case, the step differences 1050, 1060 and 1070 of the structured light 1020 become greater, whereby the control unit 246 can identify the presence of the obstacle 1040.

Referring to FIG. 8 again, if it is determined that the obstacle exists in step S855, the control unit 246 determines whether the obstacle is first sensed (i.e., sensed for the first time) in the middle of the tracking operation of the boundary of the floor object (operation S860). If the obstacle is first sensed, the control unit 246 instructs the moving direction of the robot 100 to be in a direction contrary to the current direction. At this time, traveling unit 210 rotates the moving direction of the robot 100 at an angle of 180° and again moves the robot along the boundary of the floor object (operation S865). In this case, it is possible to again measure the boundary of the floor object and move the robot 100 in accordance with the measured boundary direction as described in operations S810 to S820.

Meanwhile, as a result of operation S860, if the obstacle is second sensed (i.e., sensed, but not for the first time), the tracking operation of the floor object ends.

If the tracking operation of the boundary of the floor object ends through the above steps, the detection unit 250 detects the floor object through operation S770 of FIG. 7. The detection method of the floor object may depend on whether the floor object is in contact with the obstacle.

Figure 11A:
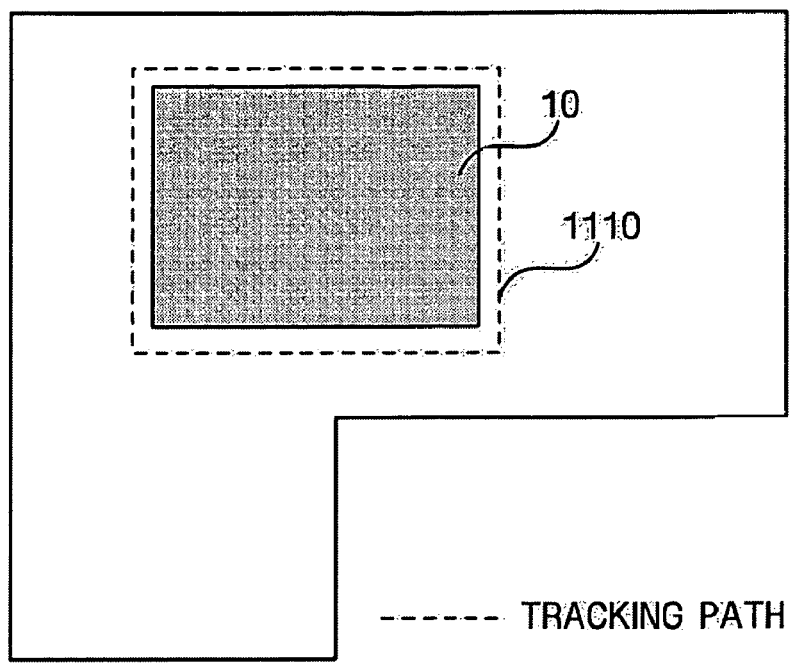
FIGS. 11A to 11D illustrate when a floor object is detected according to an embodiment of the present invention.

If the floor object is not in contact with the obstacle as shown in FIG. 11A, the moving path 1110 (hereinafter referred to as "tracking path") of the robot forms the closed loop during the tracking step of the floor object 10. If the tracking path forms the closed loop, the detection unit 250 determines the area delimited by the tracking path 1110 as the area where the floor object 10 exists.

Figure 11B:
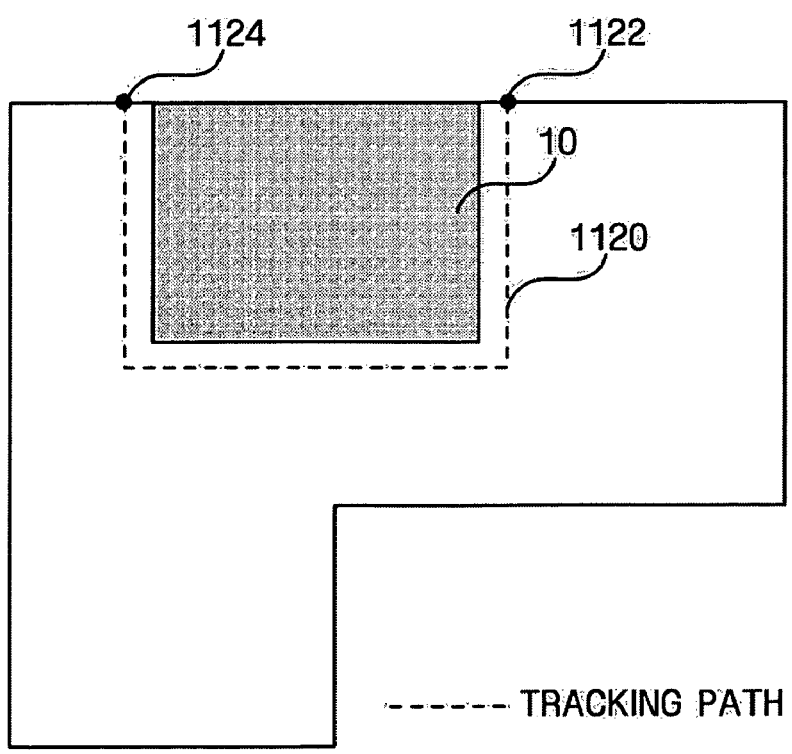

Meanwhile, if one boundary (side) of the floor object 10 is in contact with the obstacle as shown in FIG. 11B, the robot 100 tracks the other three boundaries of the floor object 10. Accordingly, the tracking path 1120 is formed by three lines connected at a specified angle. In this case, the detection unit 250 determines a closed loop as the area of the floor object, wherein the closed loop is obtained by connecting both end points 1122 and 1124 of the tracking path 1120 with each other.

Figure 11C:
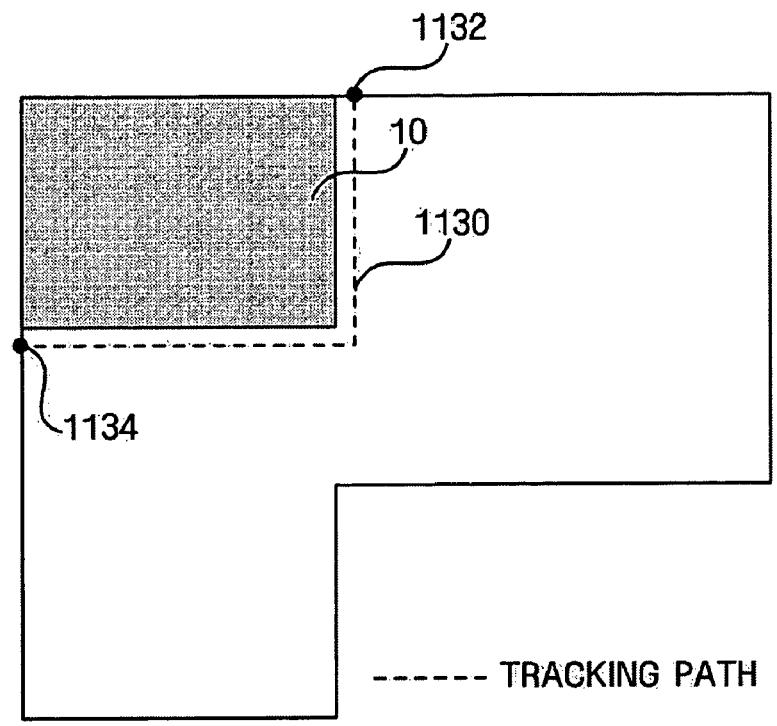

Furthermore, if two boundaries (sides) of the floor object 10 are in contact with the obstacle as shown in FIG. 11C, the robot 100 tracks the other two boundaries of the floor object 10. Accordingly, the tracking path 1130 is formed by two lines connected at a specified angle. In this case, the detection unit 250 subjects the tracking path 1130 to symmetrical processing around a segment 1136 that connects both ends points 1132 and 1134 of the tracking path 1130 with each other, and determines a closed loop obtained by the symmetrically processed result as the area of the floor object 10.

Figure 11D:
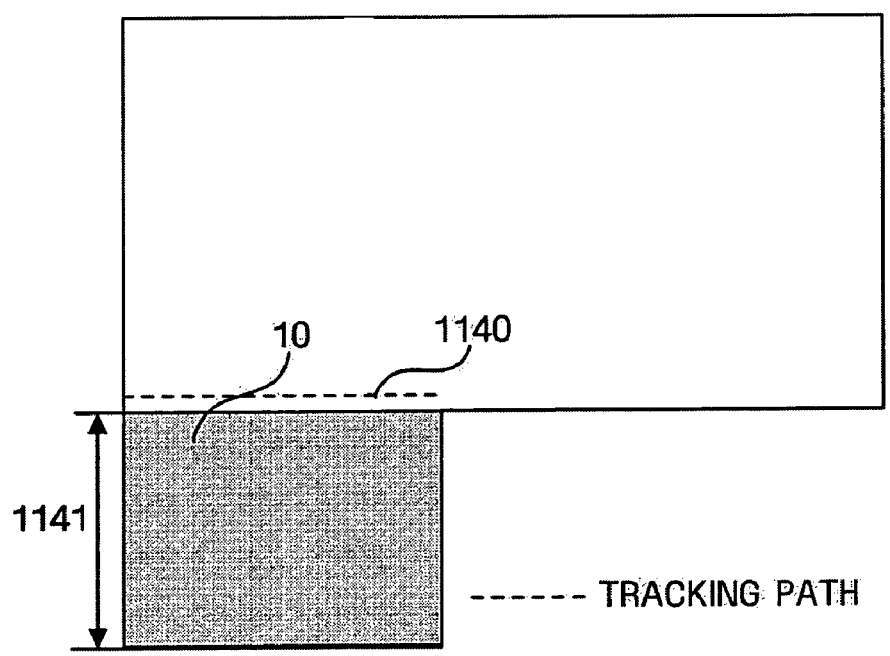

Still further, if three boundaries (sides) of the floor object 10 are in contact with the obstacle as shown in FIG. 11D, the robot 100 tracks the other one boundary of the floor object 10. In this case, the detection unit 250 determines the area of the floor object 10 using color information of the floor object 10. In more detail, if one boundary of the floor object 10 is identified, the traveling unit 210 moves the robot 100 at a specified distance in a direction vertical to the boundary direction of the floor object 10 under the control of the control unit 246. Preferably, the traveling unit 210 can move the robot 100 from the middle portion of the boundary of the floor object 10 to the direction vertical to the boundary direction of the floor object 10.

Figure 12:
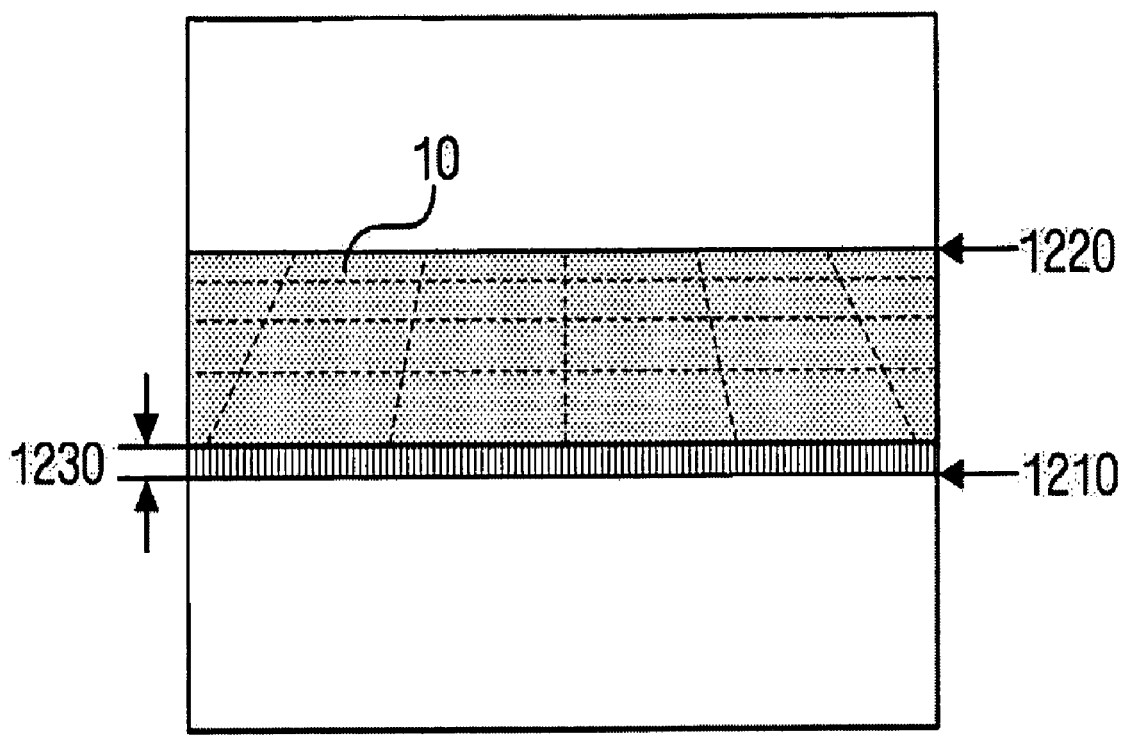
FIG. 12 illustrates an image frame of a floor object taken by a camera according to an embodiment of the present invention.

Next, the traveling unit 210 rotates the robot 100 toward the floor object 10, and the imaging unit 230 takes the floor object 10. At this time, the floor object 10 is in the image frame provided from the imaging unit 230 as shown in FIG. 12. The detection unit 250 divides the area having a chroma difference within a threshold value with color information of the floor object 10 in the image frame to determine two boundaries 1210 and 1220 of the floor object 10. In this case, the color information of the floor object 10 may previously be obtained by sampling of the area determined that the floor object 10 exists, when the boundary of the floor object is tracked. At this time, the area is determined through the position of the structured light in the image frame provided by the imaging unit 230.

If the two boundaries 1210 and 1220 of the floor object 10 are determined on the image frame, the detection unit 250 assumes the width 1141 of the floor object 10 using the distance between the two boundaries 1210 and 1220. Since the image frame is two-dimensional, that the distance of the portion 1230 corresponding to the thickness of the floor object 10 may be excluded from the distance between the two boundaries 1210 and 1220 so as to prevent measurement of the width 1141 (see FIG. 11D) of the floor object 10 from being affected by the portion 1230 showing the height of the floor object 10. The thickness of the floor object 10 can be determined by a numerical value corresponding to the height difference of the floor object 10 obtained through the structured light when the floor object 10 is sensed. To this end, information of the actual distance between the positions corresponding to lines of a specified position in the image frame is previously stored, so that the detection unit 250 can use this information.

If the width of the floor object 10 is determined, the detection unit 250 calculates the size of the floor object 10 by a value obtained by multiplying the width of the floor object 10 obtained using the color information of the floor object 10 and the tracking path 1140 of one boundary of the floor object 10, and determines the presence area of the floor object.

Meanwhile, the detection unit 250 may measure the material of the floor object. Although the material of the floor object may be measured by known methods, the detection unit 250 may measure the material of the floor material through the structured light. To this end, the traveling unit 210 moves the robot 100 to allow the structured light to scan the surface of the floor object under the control of the control unit 246. At this time, the structured light projected on the surface of the floor object is taken in the consecutive image frames provided by the imaging unit 230. The detection unit 250 acquires the height information of the position where the structured light is projected, using position information of the structured light on the image frame. Then, the detection unit 250 removes noise from the height information and then calculates high frequency components of the remaining information.

Figure 13A:
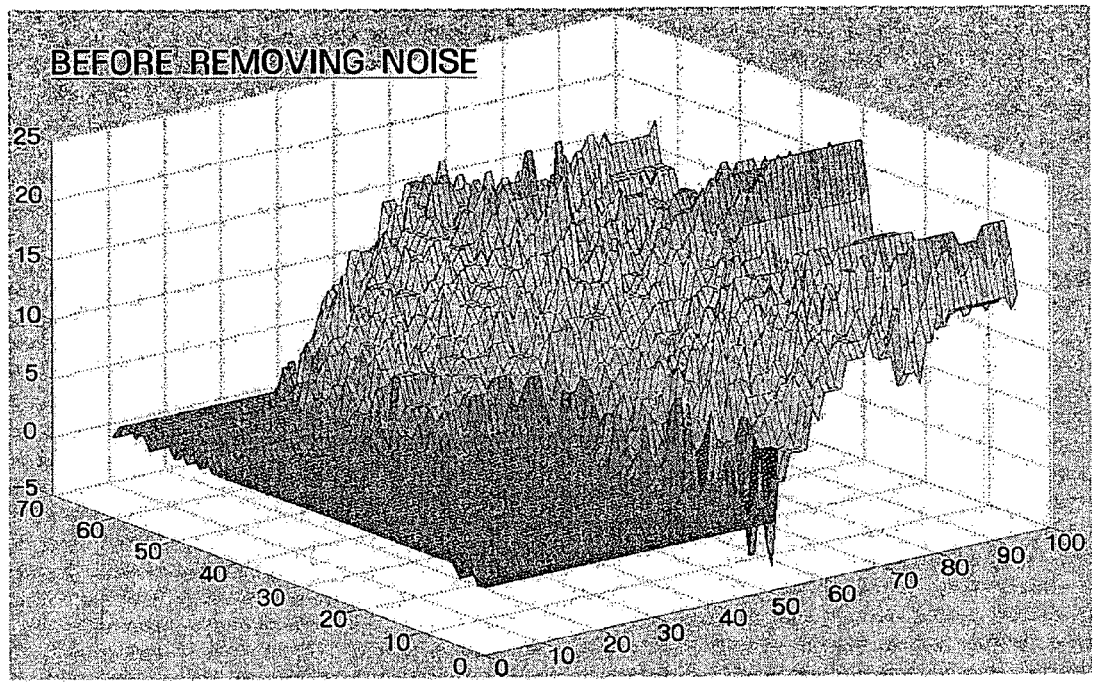
FIGS. 13A to 13D illustrate height information of a floor object obtained through a structured light according to an embodiment of the present invention.
Figure 13B:
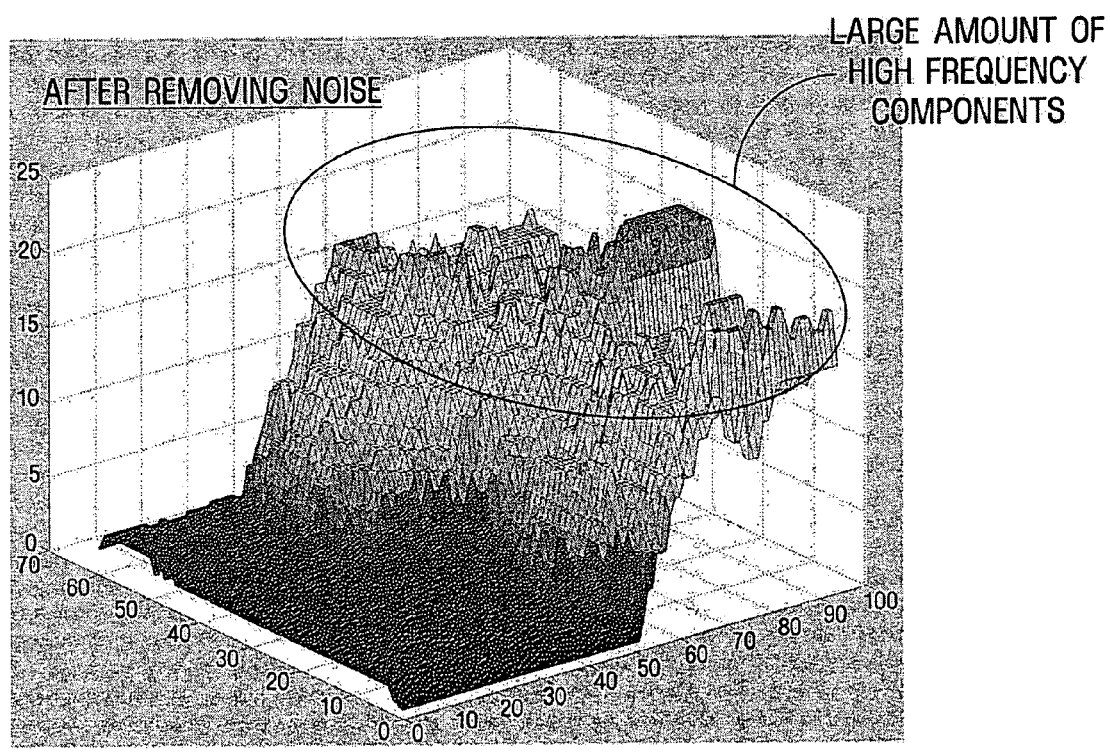
Figure 13C:
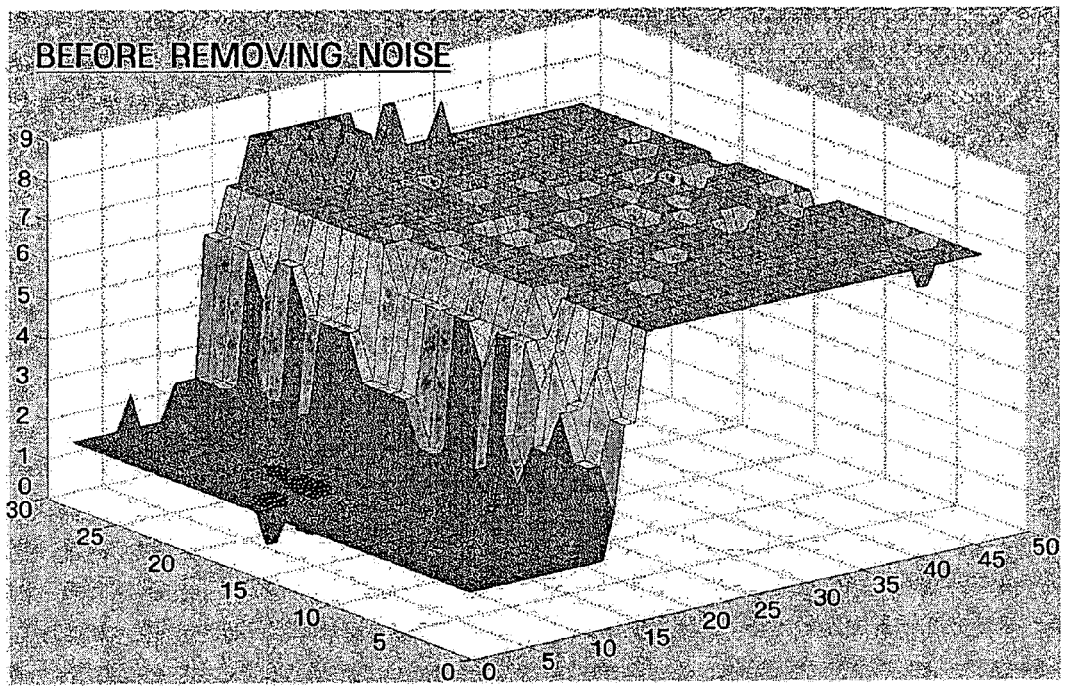
Figure 13D:
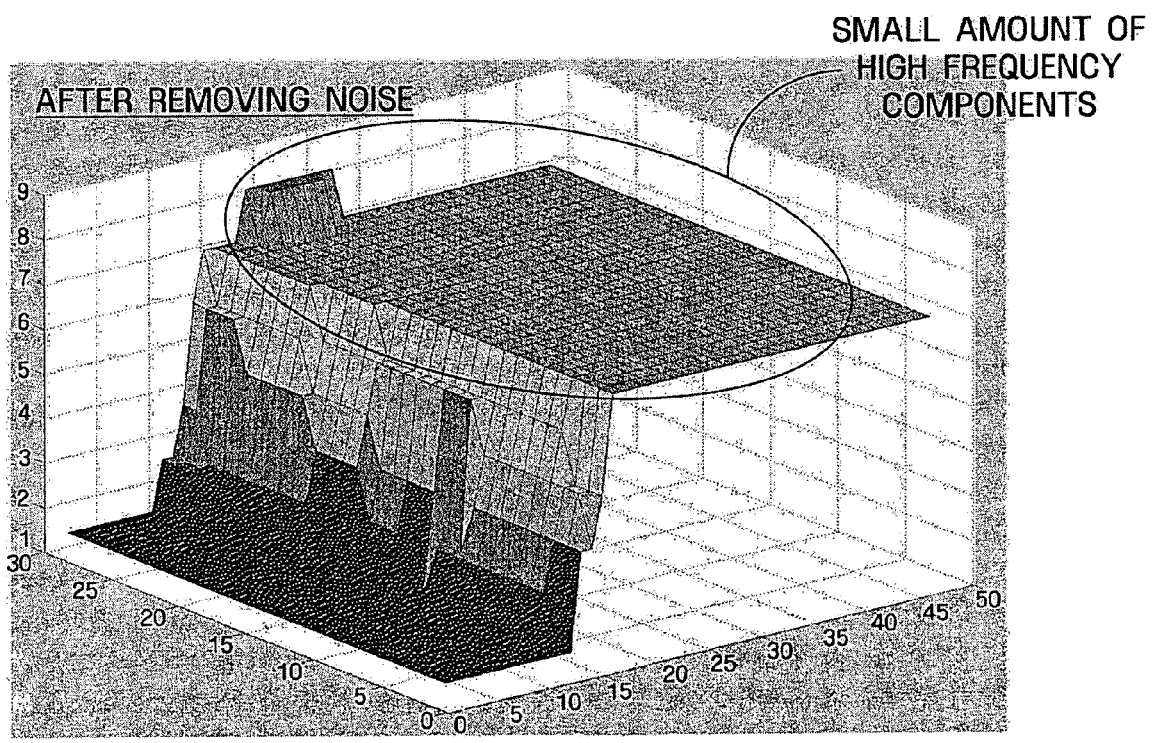

The height information of the floor object whose surface is rough due to long naps as shown in FIG. 13A includes a lot of high frequency components even though noise is removed as shown in FIG. 13B. Accordingly, the high frequency components exceed a specified threshold value, the detection unit 250 determines the floor object as the object having long naps and reflects the determined result in the detection information of the floor object. However, the height information of the floor object whose surface is even due to short naps as shown in FIG. 13C includes small high frequency components if noise is removed as shown in FIG. 13D. Accordingly, the high frequency components do not exceed the specified threshold value, the detection unit 250 determines the floor object as the even object and reflects the determined result in the detection information of the floor object.

As described above, the method of detecting an object using a structured light and the robot using the same according to the above-described embodiments of the present invention have the following advantages.

First, it is possible to detect the floor object that can affect the operation of the robot.

Second, the robot can separately be operated for each floor object through detection of the floor objects.

Finally, since the floor object can be detected without movement of the robot to the surface of the floor object, the robot can be operated for the floor object even when the presence of the floor object is not detected.

Embodiments of the present invention can be written as code/instructions/computer programs and can be implemented in general-use digital computers that execute the code/instructions/computer programs using a computer readable recording medium. Examples of the computer readable recording medium include magnetic storage media (e.g., ROM, floppy disks, hard disks, etc.), optical recording media (e.g., CD-ROMs, or DVDs), and storage media such as carrier waves (e.g., transmission through the Internet). The computer readable recording medium can also be distributed over network coupled computer systems so that the computer readable code is stored and executed in a distributed fashion.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A robot comprising:
an imaging unit providing an image frame of an area onto which a structured light is projected;
a traveling unit tracking a boundary of a floor object using a position of the structured light in the image frame;
a detection unit detecting the floor object using a traveling path of the traveling unit; and
a boundary measurement unit measuring a third boundary direction of the floor object through a sum of a weight value of a first boundary direction measured using the position of the structured light in the image frame and a weight value of a second boundary direction measured using a difference between color information of the floor object and color information of a floor in the image frame,
wherein the traveling unit tracks the floor object in parallel with the third boundary direction.

2. The robot of claim 1, further comprising:
a projection unit projecting the structured light;
a distance calculator calculating a height difference of a position onto which the structured light is projected from a reference position, using the position of the structured light in the image frame.

3. The robot of claim 1, wherein the structured light is a single linear type, a plurality of linear types, or a matrix shaped linear type.

4. The robot of claim 1, further comprising a boundary measurement unit measuring a boundary direction of the floor object using the position of the structured light in the image frame.

5. The robot of claim 1, wherein the detection unit determines that a tracking path of the traveling unit is an area of the floor object, when the tracking path forms a closed loop.

6. The robot of claim 1, wherein the detection unit determines that a closed loop obtained by connecting both end points of the tracking path is an area of the floor object, when the tracking path forms three lines connected at a specified angle.

7. The robot of claim 1, wherein the detection unit determines a closed loop, which is obtained by subjecting a segment that connects both end points of the tracking path to symmetry processing, is an area of the floor object, when the tracking path forms two lines connected at a specified angle.

8. The robot of claim 1, wherein the detection unit calculates a width of the floor object using distance information between two boundaries of the floor object in an image frame generated by allowing the imaging unit to take the floor object in a direction vertical to the tracking path, when the tracking path is a single segment, and determines an area of the floor object using the tracking path and the calculated width.

9. The robot of claim 1, wherein the detection unit categorizes a type of the floor object in accordance with a size of the floor object.

10. The robot of claim 1, wherein the detection unit categorizes a material of the floor object using height information of a surface of the floor object, the height information being obtained through the structured light projected onto the floor object.

11. The robot of claim 1, further comprising a distance calculator calculating a distance to the position onto which the structured light is projected, when the presence of the floor object is identified after the height difference is measured, wherein the traveling unit moves within a specified distance from the floor object using the calculated distance.

12. The robot of claim 1, further comprising a map management unit updating a reference map to reflect information of the detected floor object.

13. The robot of claim 1, further comprising a projection unit projecting the structured light.

14. A method of detecting a floor object using a structured light, comprising:
measuring a height difference of a position onto which a structured light is projected from a reference position; and
detecting the floor object using the measured height difference,
wherein the detecting the floor object comprises tracking a boundary of the floor object using the structured light, and detecting the floor object in accordance with a tracking path of the boundary of the floor object, and
wherein the tracking the boundary comprises providing an image frame of the position onto which the structured light is projected, measuring a first boundary direction of the floor object using the position of the structured light in the image frame corresponding to the position onto which the structured light is projected, measuring a second boundary direction of the floor object using a difference between color information of the floor object and color information of a floor in the image frame, calculating a third boundary direction of the floor object through a sum of weight values of the first and second boundary directions, and moving in a direction parallel with the third boundary direction.

15. The method of claim 14, wherein the measuring a height difference comprises:
projecting the structured light;
providing an image frame of the position onto which the structured light is projected; and
calculating the height difference of the position of the structured light, using a position of the structured light in the image frame.

16. The method of claim 14, wherein the structured light is a single linear type, a plurality of linear types, or a matrix shaped linear type.

17. The method of claim 14, wherein the tracking the boundary comprises:
providing an image frame of the position onto which the structured light is projected;
measuring a boundary direction of the floor object using the position of the structured light in the image frame, which corresponds to the position onto which the structured light is projected; and
moving in a direction parallel with the boundary direction.

18. The method of claim 14, wherein the detecting the floor object comprises determining that the tracking path is an area of the floor object, when the tracking path forms a closed loop.

19. The method of claim 14, wherein the detecting the floor object comprises determining that a closed loop obtained by connecting both end points of the tracking path is an area of the floor object, when the tracking path forms three lines connected at a specified angle.

20. The method of claim 14, wherein the detecting the floor object comprises determining that a closed loop, which is obtained by subjecting a segment that connects both end points of the tracking path to symmetry processing, is an area of the floor object, when the tracking path forms two lines connected at a specified angle.

21. The method of claim 14, wherein the detecting the floor object comprises:
generating an image frame, in which two boundaries of the floor object are captured, by capturing the floor object in a direction vertical to the tracking path, when the tracking path is a single segment;
calculating a width of the floor object using distance information between the two boundaries captured in the image frame; and
determining an area of the floor object using the tracking path and the calculated width.

22. The method of claim 14, wherein the detecting the floor object comprises categorizing a type of the floor object in accordance with a size of the floor object.

23. The method of claim 14, wherein the detecting the floor object comprises:
projecting the structured light onto a surface of the floor object; and
categorizing a material of the floor object using height information of the surface of the floor object, the height information being obtained through the structured light projected onto the floor object.

24. The method of claim 14, further comprising:
calculating a distance to the position onto which the structured light is projected, when the presence of the floor object is identified after the measuring a height difference; and
moving within a specified distance from the floor object using the calculated distance.

25. The method of claim 14, further comprising updating a reference map to reflect information of the detected floor object.

26. A computer-readable storage medium encoded with processing instructions for causing a processor to execute the method of claim 14 of detecting a floor object using a structured light.

* * * * *